United States Patent
Yim et al.

(10) Patent No.: US 11,455,541 B2
(45) Date of Patent: Sep. 27, 2022

(54) AI-BASED NEIGHBOR DISCOVERY SEARCH ENGINE APPARATUSES, METHODS AND SYSTEMS

(71) Applicant: FMR LLC, Boston, MA (US)

(72) Inventors: Man Hei Raymond Yim, Cambridge, MA (US); Yinchun Wang, Quincy, MA (US)

(73) Assignee: FMR LLC, Boston, MA (US)

( * ) Notice: Subject to any disclaimer, the term of this patent is extended or adjusted under 35 U.S.C. 154(b) by 1003 days.

(21) Appl. No.: 16/175,825

(22) Filed: Oct. 30, 2018

(65) Prior Publication Data

US 2019/0347556 A1 Nov. 14, 2019

Related U.S. Application Data

(60) Provisional application No. 62/669,929, filed on May 10, 2018.

(51) Int. Cl.
| | |
|---|---|
| *G06E 1/00* | (2006.01) |
| *G06N 3/08* | (2006.01) |
| *G06K 9/62* | (2022.01) |
| *G06N 3/04* | (2006.01) |
| *G06F 16/951* | (2019.01) |

(52) U.S. Cl.
CPC ........... *G06N 3/084* (2013.01); *G06F 16/951* (2019.01); *G06K 9/6215* (2013.01); *G06N 3/0481* (2013.01)

(58) Field of Classification Search
CPC .... G06N 3/084; G06N 3/0481; G06F 16/951; G06F 16/903; G06K 9/6215; G06K 9/6228; G06K 9/627; G06K 9/6256; G06K 9/6276
See application file for complete search history.

(56) References Cited

U.S. PATENT DOCUMENTS

| | | | |
|---|---|---|---|
| 10,635,949 B2 * | 4/2020 | Soldevila | G06V 30/226 |
| 11,216,701 B1 * | 1/2022 | Sim | G06V 10/778 |
| 2019/0279074 A1 * | 9/2019 | Lin | G06N 3/0481 |
| 2019/0286932 A1 * | 9/2019 | Du | G06V 10/50 |

* cited by examiner

*Primary Examiner* — Dhaval V Patel
(74) *Attorney, Agent, or Firm* — Hanchuk Kheit LLP; Walter G. Hanchuk

(57) ABSTRACT

The AI-Based Neighbor Discovery Search Engine Apparatuses, Methods and Systems ("ANDSE") transforms embedding neural network training request, object search request inputs via ANDSE components into embedding neural network response, object search response outputs. An embedding neural network training request associated with a set of context objects is obtained. Sample similarity evaluation metrics are determined. For each context object, a set of positive target samples that satisfy the sample similarity evaluation metrics for the respective context object is determined. For each context object and each positive target sample in the respective set of positive target samples, a training example comprising the respective context object and a positive target sample is added to a training set. Configuration parameters for an embedding neural network are determined. The embedding neural network is trained using training examples in the training set. A datastructure that stores the adjusted weights of the embedding neural network is generated.

18 Claims, 19 Drawing Sheets

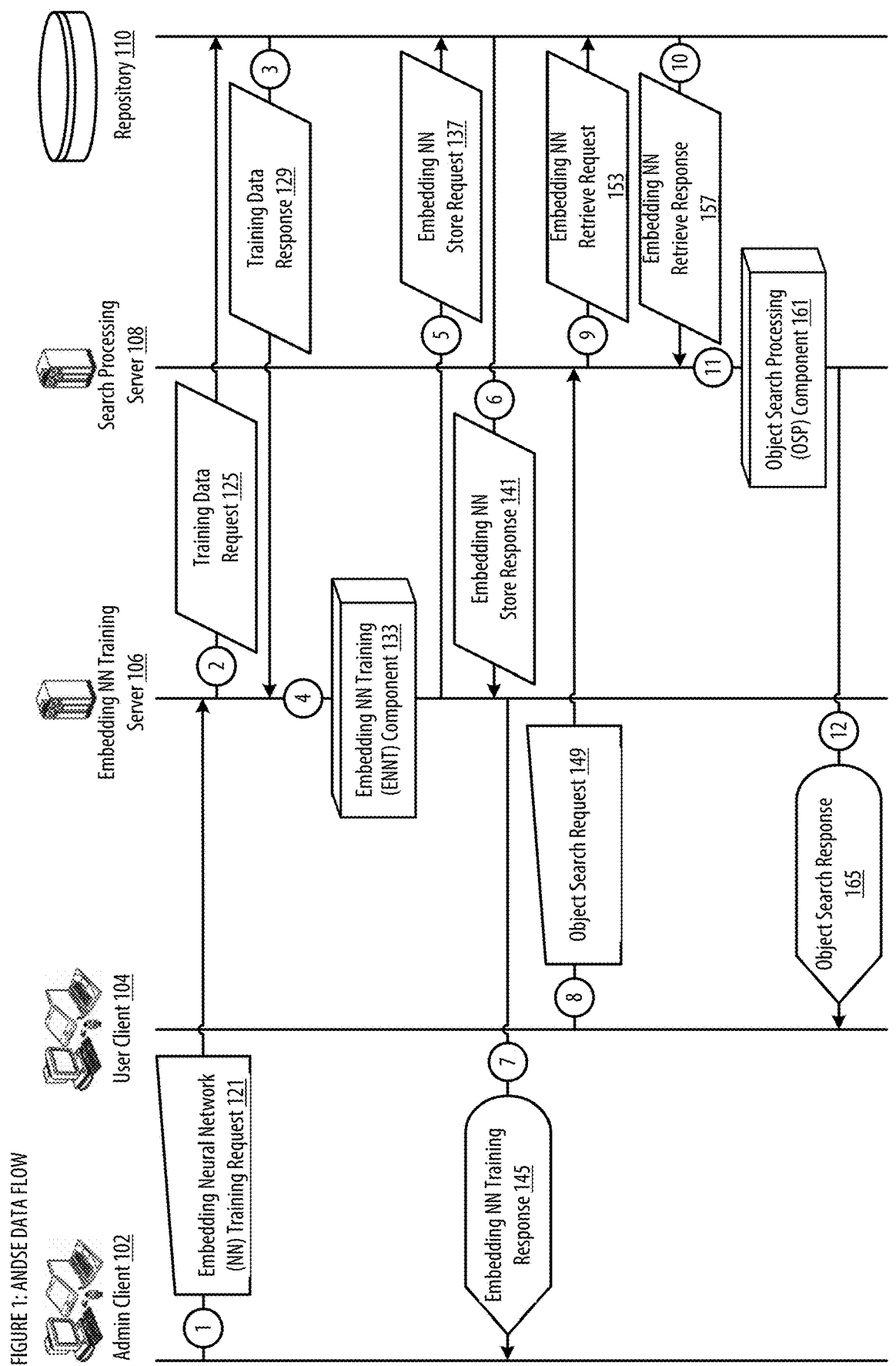

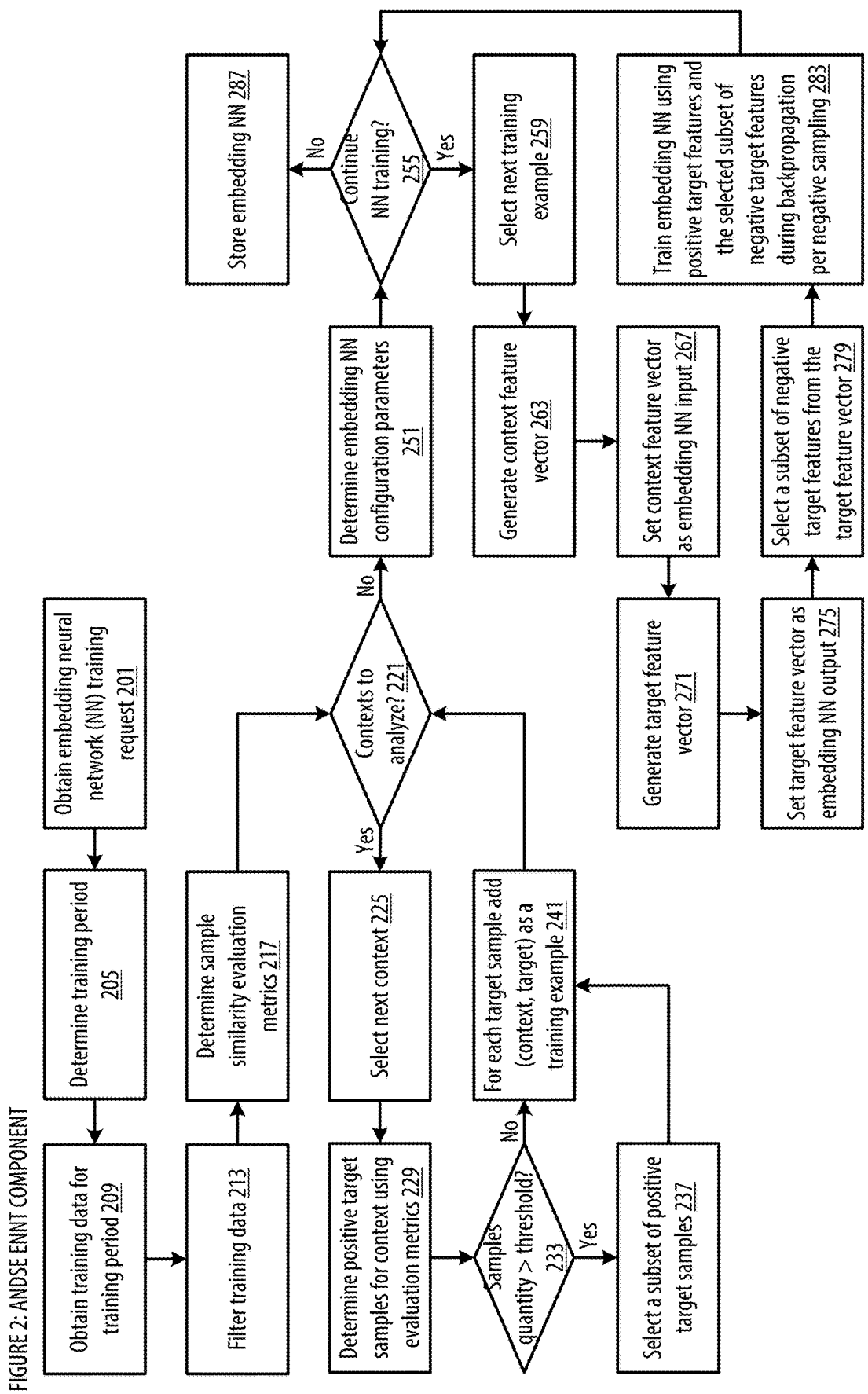
FIGURE 2: ANDSE ENNT COMPONENT

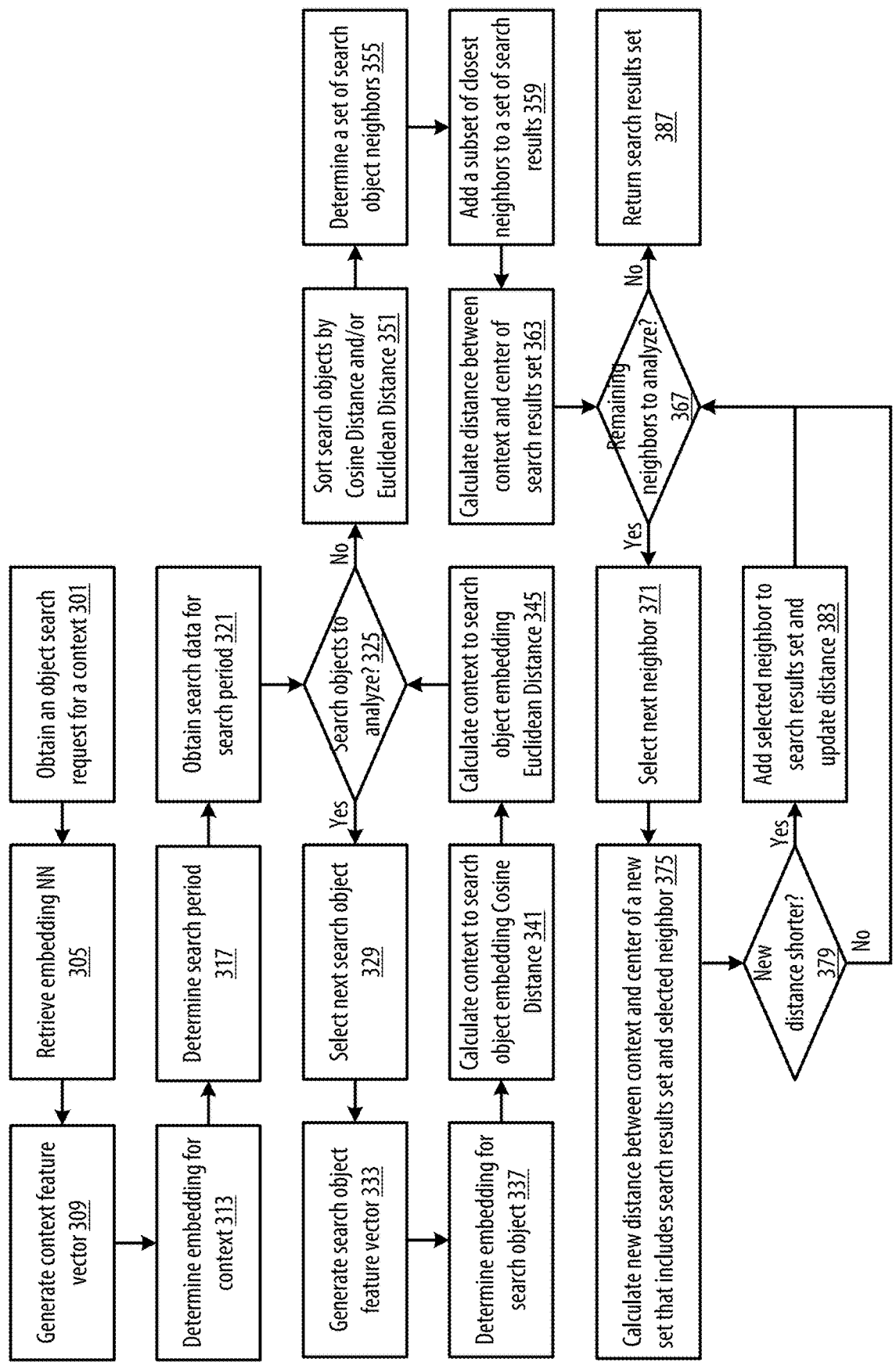

FIGURE 4: ANDSE SCREENSHOT

| field | | | | | | | | | | |
|---|---|---|---|---|---|---|---|---|---|---|
| sprating | AA+ | AA | AA- | A+ | AA+ | AA- | AAA | AA | AA | A |
| moodyrating | | A2 | | | AA2 | AA3 | AA1 | AA2 | AA2 | WR |
| spunderlyingrating | | BBB+ | | | | | | | | |
| moodyunderlyingrating | | | | | AA2 | AA3 | AA1 | AA2 | AA2 | |
| state | MI | TX | SC | MT | DC | NY | CT | SC | NM | NJ |
| municipalstatecode | E1 | U2 | G2 | E1 | U2 | E5 | G4 | E6 | E6 | H1 |
| revenuesourcecode | G | G | G | G | R | R | G | R | R | R |
| distributionfrequencycode | S | S | S | S | S | S | S | S | S | S |
| taxableindicator | E | E | E | E | E | E | E | E | E | E |
| makewholecallindicator | N | N | N | N | N | N | N | N | N | N |
| bankqualifiedindicator | N | Y | Y | N | N | N | N | N | N | N |
| sinkscheduleexists | N | N | N | N | N | N | N | N | N | Y |
| stepscheduleexists | Y | Y | N | N | Y | Y | N | Y | Y | N |
| callscheduleexists | N | N | N | N | N | N | N | N | N | Y |
| alternateminimumtaxstatusindicator | | | | | | | | | | N |
| escrowtypecode | | | | | | | | | | |
| issueinsurerdescription | | ASSURED GUARANTY MUNICIPAL CORP | | | | | | | | AMBAC |
| calldefeasedcode | | | | | | | | | | |
| couponrate | 5 | 3 | 2 | 5 | 5 | 5 | 4 | 2.5 | 2.5 | 4.5 |
| extraordinaryredemptionindicator | N | N | N | N | N | Y | N | N | N | Y |
| prerefund | 0 | 0 | 0 | 0 | 0 | 0 | 0 | 0 | 0 | 0 |
| matureyear | 12 | 8 | 1 | 7 | 13 | 10 | 1 | 10 | 10 | 4 |
| callyear | 9 | 2 | | | 7 | 9 | | 8 | 8 | |

FIGURE 5: ANDSE SCREENSHOT

| field | values | count |
|---|---|---|
| sprating | /A/A+/A-/A-1/A-2/AA/AA+/AA-/AAA/B/B+/B-/BB/BB+/BB-/BBB/BBB+/BBB-/CCC/NR/SP-1+ | 23 |
| | A1/A2/A3/AA1/AA2/AA3/Aaa/Aa2/Aa3/Aaa/B1/B3/BA1/BA2/BA3/BAA1/BAA2/BAA3/CA/CAA2/C-AA3/MG1/NR/P-1/P- | 31 |
| moodyrating | 2/SG/VMIG1/VMIG2/VMIG3/WR | 21 |
| spunderlyingrating | /A/A+/A-/AA/AA+/AA-/AAA/B/B+/B-/BB/BB+/BB-/BBB/BBB+/BBB-/CC/CCC/CCC+/NR | 26 |
| moodyunderlyingrating | /A1/A2/A3/AA1/AA2/AA3/AAA/B1/B2/B3/BA1/BA2/BA3/BAA1/BAA2/BAA3/C/CA/CAA1/CAA2/CAA3/NR/P-1/P-2/WR | 56 |
| state | AK/AL/AR/AZ/C-ACO/CT/DC/DE/FL/GA/GU/HI/IA/ID/IL/IN/KS/KY/LA/MA/MD/ME/MI/MN/MO/MS/MT/NC/ND/NE/NH/NJ/NM/NV/ NY/OH/OK/OR/PA/PR/RF/RI/SC/SD/TN/TX/US/UT/VA/VI/VT/WA/WI/WV/WY | |
| underlyingstate | AK/AL/AR/AZ/C-ACO/CT/DC/DE/FL/GA/GU/HI/IA/ID/IL/IN/KS/KY/LA/MA/MD/ME/MI/MN/MO/MS/MT/NC/ND/NE/NH/NJ/NM/NV/ NY/OH/OK/OR/PA/PR/RI/SC/SD/TN/TX/US/UT/VA/VI/VT/WA/WI/WV/WY | 55 |
| sector | +/A1/A2/A3/A4/A6/A7/A9/E1/E2/E3/E4/E5/E6/E7/E9/G1/G2/G3/G4/G5/G6/G7/G9/GA/GB/GC/GE/GP/H1/H2/H3/H4/H9/I1/I2/R3/I4 /I5/I6/I7/I8/I9/IA/IB/R1/R2/R3/R4/R9/T1/T2/T3/T4/T5/T6/T7/T8/T9/U1/U2/U3/U4/U5/U6/U7/U8/U9/UA/UB/Z1/Z2/Z3/Z9 | 74 |
| revenuesourcecode | /AB/C/D/E/F/G/H/J/L/M/P/R/S/T/V/W | 18 |
| distributionfrequencycode | /A/I/MQ/S/T/W | 8 |
| taxableindicator | E/T | 2 |
| makewholecallindicator | N/Y | 3 |
| bankqualifiedindicator | N/U/Y | 4 |
| sinkscheduleexists | N/Y | 2 |
| stepscheduleexists | N/Y | 2 |
| callscheduleexists | N/Y | 2 |
| alternateminimumtaxstatusindicator | N/Y | 2 |
| escrowmaturityindicatory | N/Y | 2 |
| escrowtypecode | /AB/C/D/E/F/H/J/K/L/N/O/R/S/U/V/W | 18 |
| | /AC/AD/AE/AG/AH/AI/AJ/AK/AM/AN/AS/AX/AY/B/A/BH/B M/BS/CA/CC/CD/CF/CG/CI/CL/CS/F A/FB/FC/FE/FG/FH/FJ/FK/FL/FM /FR/FS/FX/GM/IF/IG/III/LF/LS/MA/MB/MD/MN/A/P/MS/N/AR/AR M/RS/SB/SC/SD/SG/SH/SI/SJ/SR/XA/XE/XG/XH/XI/XJ/XL/XM/X | 78 |
| issueinsurercode | N/XO/XQ/XR/XT/XY/ZC | 4 |
| callidefeasedcode | /D/N/Y | 3 |
| extraordinaryredemptionindicator | N/Y | 13 |
| refundtypecode | /AB/C/D/E/F/O/P/R/T/X/Z | 9 |
| coupontype | AD/J/CCA/FIX/FLT/FLX/RMT/STP/VAR/ZER | |
| | 0/3/6/9/12/15/18/21/24/27/30/33/36/33/42/45/48/51.54/57/60/63/66/69/72/75/78/81/84/67/90/93/96/99/102/105/108/111/114/117/ 120/123/126/129/132/135/138/14/144/147/150/153/156/159/162/165/168/171/174/177/180/192/204/216/226/240/252/264/276 | 93 |
| maturitydate | 288/300/312/324/336/348/360/372/384/396/4084/204/480/540/60/600/660/720/780/840/900/960/1020/1080/1140 | |
| | 0/3/6/9/12/15/18/21/24/27/30/33/36/39/42/45/48/51/54/57/60/63/66/69/72/75/78/81/84/87/90/93/96/99/102/105/108/111/114/117/ 120/123/126/129/132/135/138/14/144/147/150/153/156/159/162/165/168/171/174/177/180/192/204/216/228/240/252/264/276 | 93 |
| nextcalldate | 288/300/312/324/336/348/360/372/384/396/408/420/480/540/600/660/720/780/840/900/960/1020/1080/1140 | |
| | +/A1/A2/A3/A4/A6/A7/A9/E1/E2/E3/E4/E5/E6/E7/E9/G1/G2/G3/G4/G5/G6/G7/G9/GA/GB/GC/GE/GP/H1/H2/H3/H4/H9/I1/I2/R3/I4 0/3/6/9/12/15/16/21/24/27/30/33/36/39/42/45/48/51/54/57/60/63/66/69/72/75/78/81/84/87/90/93/96/99/102/105/108/111/114/117/ 120/123/126/129/132/135/138/14/144/147/150/153/156/159/162/165/168/171/174/177/180/192/204/216/228/240/252/264/276 | 93 |
| worstdate | 288/300/312/324/336/348/360/372/384/396/408/420/480/540/600/660/720/780/840/900/960/1020/1080/1140 | |
| | 0/0.1/0.2/0.3/0.4/0.5/0.6/0.7/0.8/0.9/1.1/1.21.3/1.4/1.5/1.6/1.7/1.8/1.9/2.2.1/2.2/2.3/2.4/2.5/2.6/2.7/2.8/2.9/3/3.1/3.2/3.3/3.4/3.5/ | |
| couponrate | 3.6/3.7/3.8/3.9/4/4.1/4.2/4.3/4.4/4.5/4.6/4.7/4.8/4.9/5/5.1/5.2/5.3/5.4/5.5/5.6/5.7/5.8/5.9/6/6.1/6.2/6.3/6.4/6.5/6.6/6.7/6.8/6.9/7/7.1/ 7.2/7.3/7.4/7.5/7.6/7.7/7.8/7.9/8/8.1/8.2/8.3/8.4/8.5/8.6/6.7/8.8/8.9/9/9.2/9.3/9.5/9.6/9.7/9.8/10/12/12.5/12.7/14/15 | 103 |
| issuesize | 4/5/6/7/8 | 5 |
| taxrate | 0/3/3.5/4/4.5/5.5/6/6.5/7/7.5/8/9/10/12.5/13.5 | 17 |

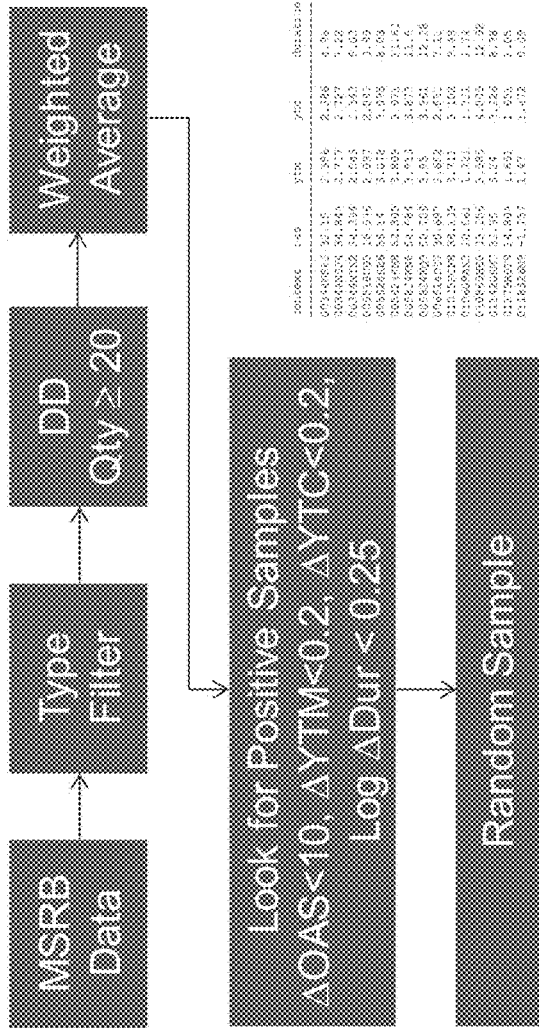
FIGURE 6: ANDSE SCREENSHOT

FIGURE 7: ANDSE SCREENSHOT
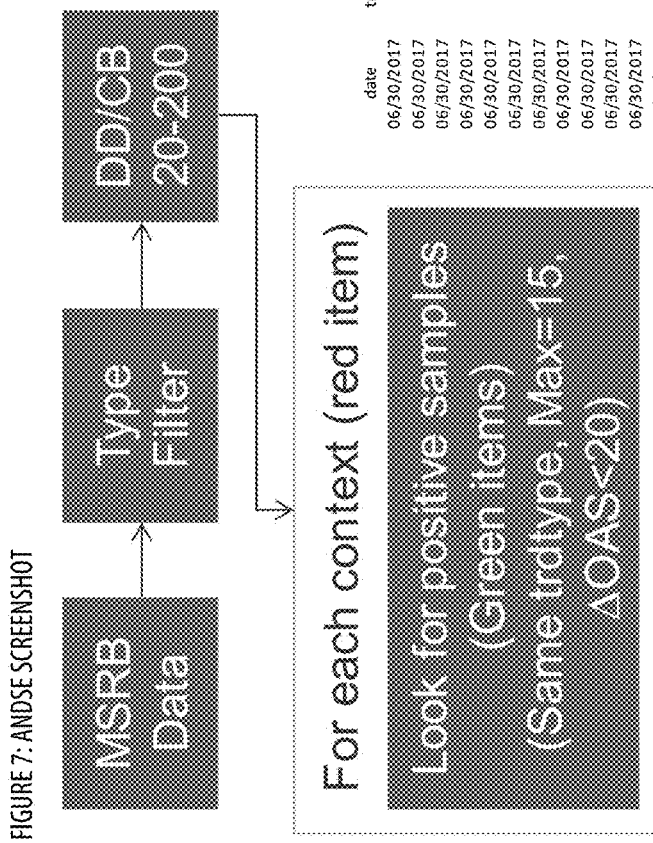

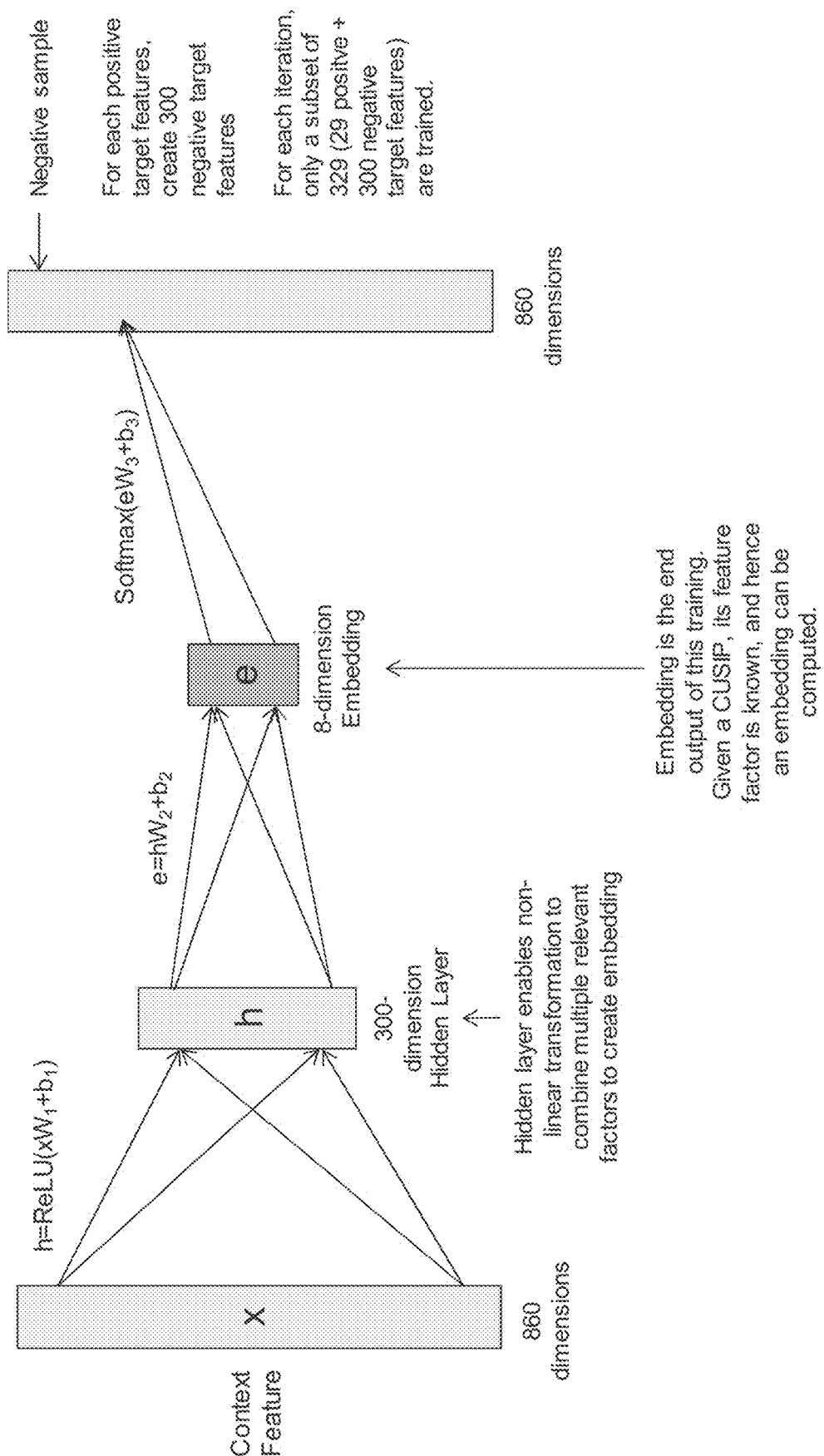
FIGURE 8: ANDSE SCREENSHOT

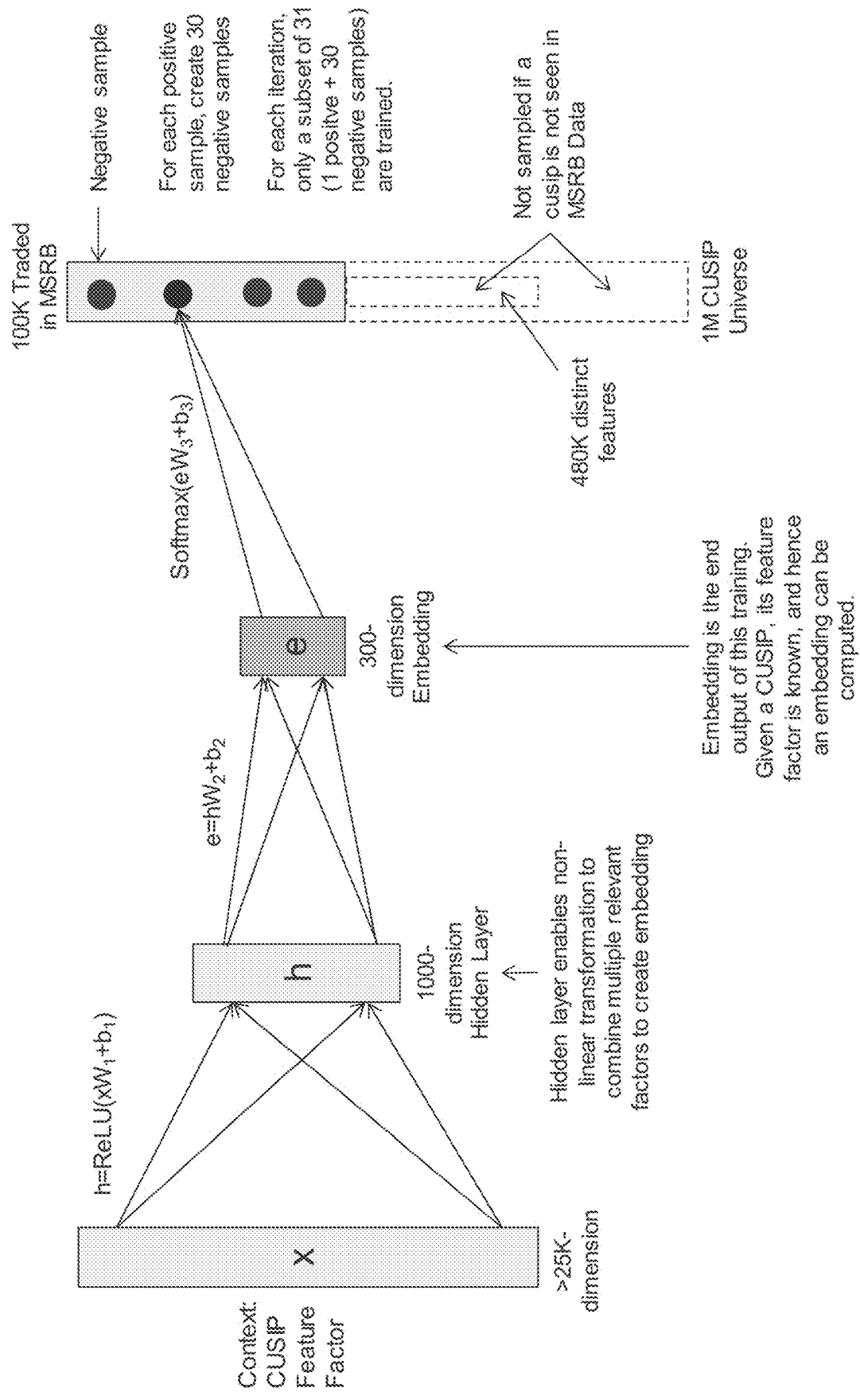
FIGURE 9: ANDSE SCREENSHOT

FIGURE 10: ANDSE SCREENSHOT

Epoch 1/5 Iteration: 100 Avg. Training loss: 59.0736 0.4331 sec/batch
Epoch 1/5 Iteration: 200 Avg. Training loss: 28.7838 0.4260 sec/batch
Epoch 1/5 Iteration: 300 Avg. Training loss: 20.0351 0.4119 sec/batch
Epoch 1/5 Iteration: 400 Avg. Training loss: 17.7882 0.4533 sec/batch
Epoch 1/5 Iteration: 500 Avg. Training loss: 13.7022 0.4088 sec/batch
Epoch 1/5 Iteration: 600 Avg. Training loss: 12.7473 0.4548 sec/batch
Epoch 1/5 Iteration: 700 Avg. Training loss: 10.4606 0.4243 sec/batch
Epoch 1/5 Iteration: 800 Avg. Training loss: 9.3247 0.3997 sec/batch
Epoch 1/5 Iteration: 900 Avg. Training loss: 8.3287 0.4111 sec/batch
Epoch 1/5 Iteration: 1000 Avg. Training loss: 7.5285 0.4259 sec/batch
Validation loss: 8.5375

Epoch 1/5 Iteration: 1100 Avg. Training loss: 6.8138 0.4259 sec/batch
Epoch 1/5 Iteration: 1200 Avg. Training loss: 6.2134 0.4180 sec/batch
Epoch 1/5 Iteration: 1300 Avg. Training loss: 5.8406 0.4271 sec/batch
Epoch 1/5 Iteration: 1400 Avg. Training loss: 5.4625 0.4055 sec/batch
Epoch 1/5 Iteration: 1500 Avg. Training loss: 5.2514 0.4050 sec/batch
Epoch 1/5 Iteration: 1600 Avg. Training loss: 5.0630 0.4006 sec/batch
Epoch 1/5 Iteration: 1700 Avg. Training loss: 4.9325 0.4113 sec/batch
Epoch 1/5 Iteration: 1800 Avg. Training loss: 4.8073 0.4061 sec/batch
Epoch 1/5 Iteration: 1900 Avg. Training loss: 4.6986 0.4148 sec/batch
Epoch 1/5 Iteration: 2000 Avg. Training loss: 4.6746 0.4144 sec/batch
Validation loss: 5.0161

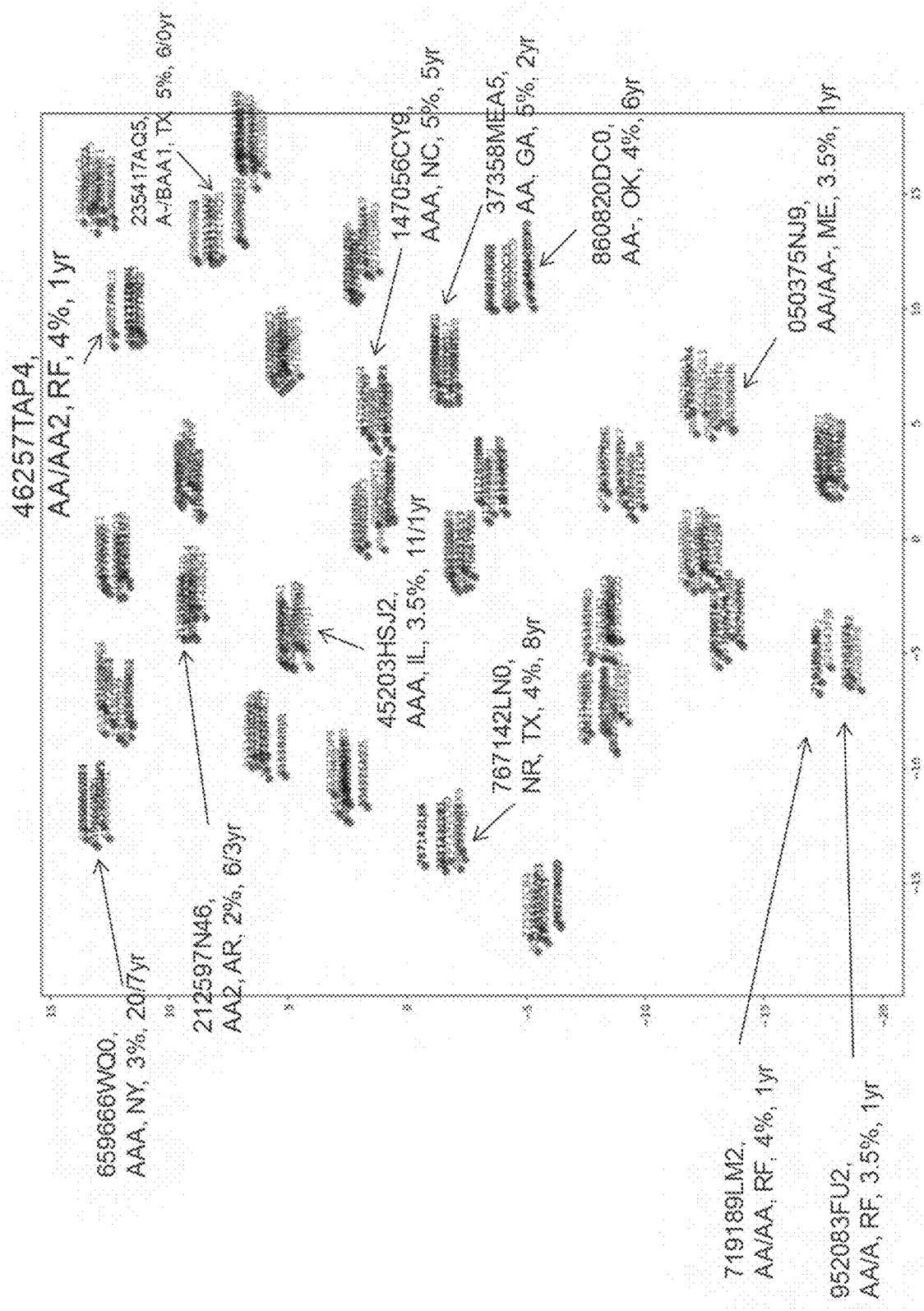
FIGURE 11: ANDSE SCREENSHOT

FIGURE 12: ANDSE SCREENSHOT

| dist | freq | oas | ytw | ytc | duration |
|---|---|---|---|---|---|
| 0 | 162433 | 15.730025 | 0.2528645 | 0.317457 | 1.281425 |
| 0.2 | 307004 | 19.030085 | 0.3153709 | 0.3740412 | 1.592107 |
| 0.4 | 309894 | 22.073383 | 0.3687212 | 0.4218473 | 1.872585 |
| 0.6 | 309920 | 23.895844 | 0.4118195 | 0.4624995 | 2.127369 |
| 0.8 | 293170 | 24.877673 | 0.4466648 | 0.5052456 | 2.337366 |
| 1 | 281680 | 25.65336 | 0.4743843 | 0.5540264 | 2.501451 |
| 1.2 | 266984 | 26.171746 | 0.4970276 | 0.6073972 | 2.626968 |
| 1.4 | 248778 | 26.723349 | 0.5178055 | 0.6939188 | 2.731789 |
| 1.6 | 229122 | 27.119984 | 0.5391866 | 0.7840033 | 2.827313 |
| 1.8 | 208738 | 28.034468 | 0.5604678 | 0.8981841 | 2.900163 |
| 2 | 192262 | 28.802293 | 0.5854747 | 0.9382677 | 3.007072 |
| 2.2 | 177934 | 29.868823 | 0.6054615 | 0.9259729 | 3.079807 |
| 2.4 | 165528 | 30.656244 | 0.6220657 | 0.9351214 | 3.154777 |
| 2.6 | 154628 | 31.428861 | 0.6387173 | 0.8855685 | 3.214531 |
| 2.8 | 146280 | 32.170844 | 0.6544126 | 0.9018387 | 3.280971 |
| 3 | 136962 | 32.953994 | 0.6686483 | 0.9279082 | 3.346169 |
| 3.2 | 130446 | 33.427966 | 0.6796174 | 0.9327716 | 3.411011 |
| 3.4 | 122672 | 33.730078 | 0.684412 | 0.9104644 | 3.463105 |
| 3.6 | 117170 | 34.188813 | 0.6945906 | 0.9678644 | 3.518195 |

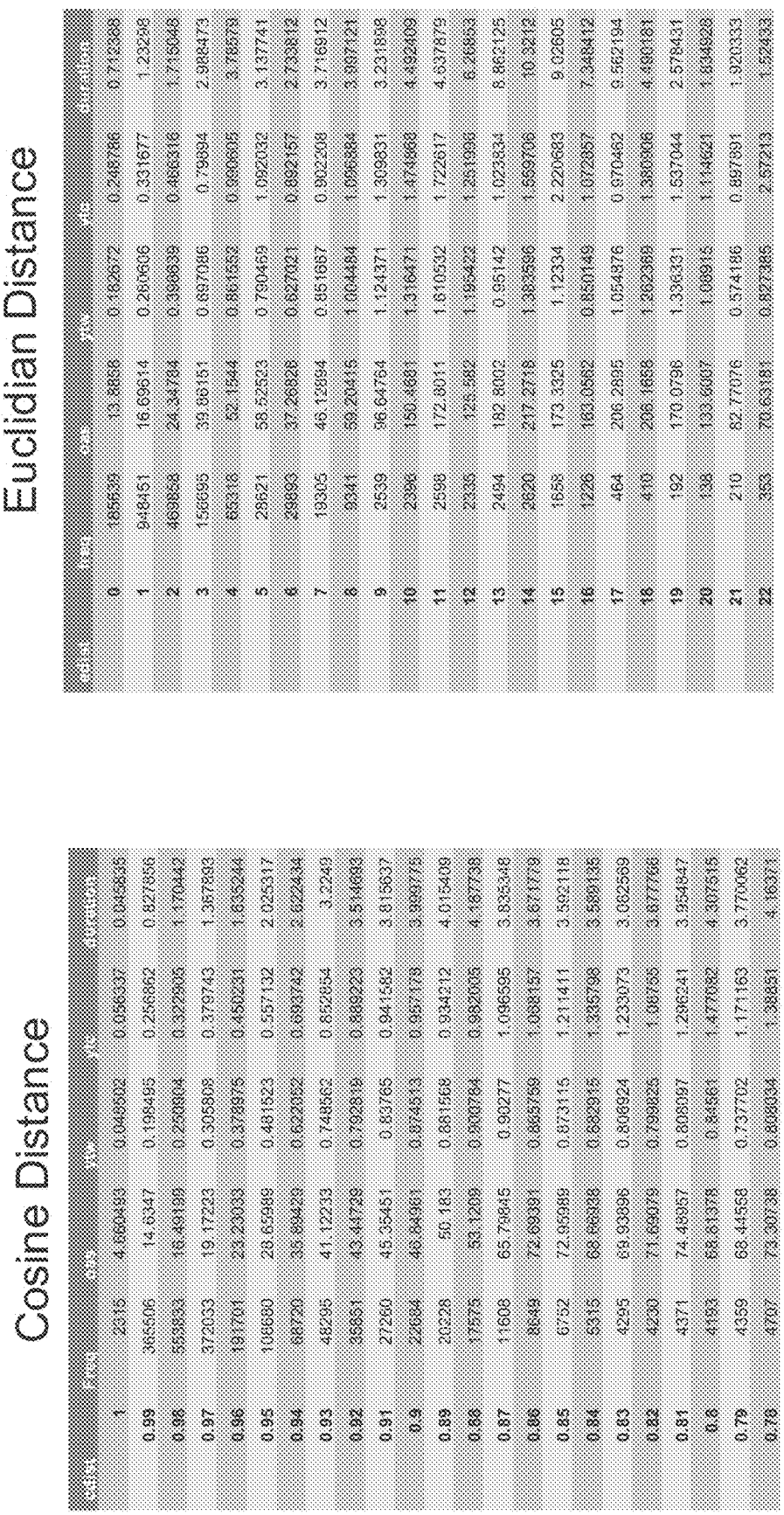
FIGURE 13: ANDSE SCREENSHOT

| dist | freq | oas | ytc | ytm | ytw | numcomp | pct |
|---|---|---|---|---|---|---|---|
| 0 | 93982 | -0.08485 | -0.007027778 | 0.114 | -0.005 | 28 | 80.08692 |
| 0.2 | 7568 | 0.369 | -0.00425 | 0.483 | -0.002381098 | 29 | 6.449084 |
| 0.4 | 3496 | -0.09125 | -0.027 | 0.7641698 | -0.02095946 | 27 | 2.979122 |
| 0.6 | 2178 | -0.961 | -0.03975 | 0.87325 | -0.041 | 27 | 1.855986 |
| 0.8 | 1484 | -1.26875 | -0.05675 | 1.113 | -0.058 | 25 | 1.264593 |
| 1 | 1079 | -1.663 | -0.062 | 1.106 | -0.06361538 | 25 | 0.9194717 |
| 1.2 | 835 | -3.751 | -0.0875 | 1.32 | -0.0855 | 25 | 0.7115467 |
| 1.4 | 695 | -3.0025 | -0.1005 | 1.418966 | -0.1005 | 25 | 0.5922454 |
| 1.6 | 555 | -3.832 | -0.092 | 1.2955 | -0.0965 | 26 | 0.4729442 |
| 1.8 | 477 | -6.4765 | -0.143 | 1.4915 | -0.143 | 27 | 0.4064764 |
| 2 | 460 | -5.2405 | -0.079 | 1.46575 | -0.0855 | 24 | 0.3919898 |
| 2.2 | 359 | -6.7 | -0.175 | 1.6505 | -0.175 | 24 | 0.3059225 |
| 2.4 | 299 | -5.520149 | -0.156 | 1.765 | -0.153 | 26 | 0.2547934 |
| 2.6 | 274 | -0.07325 | -0.1055 | 1.4255 | -0.1055 | 24.5 | 0.2334896 |

FIGURE 14: ANDSE SCREENSHOT

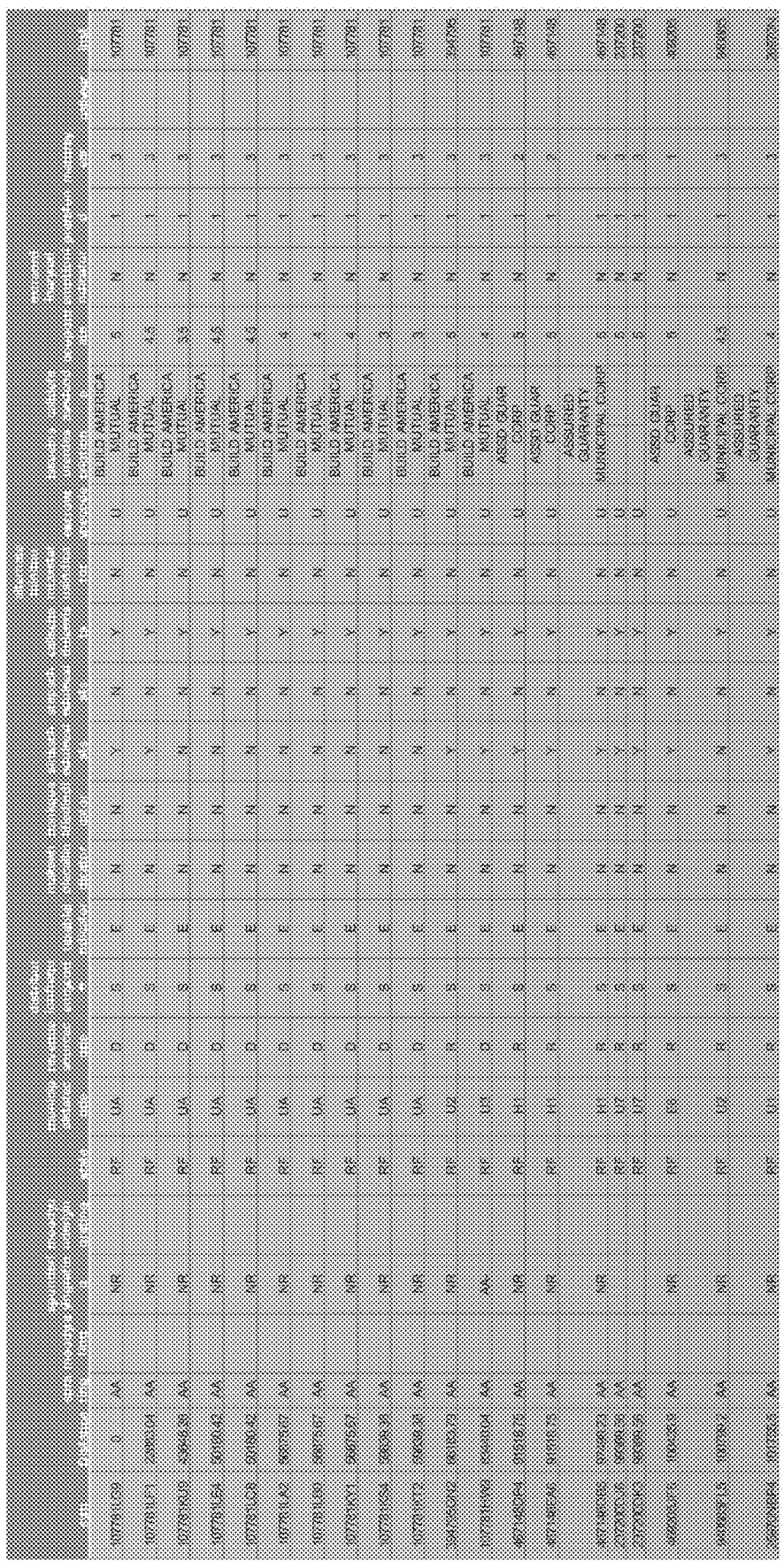
FIGURE 15: ANDSE SCREENSHOT

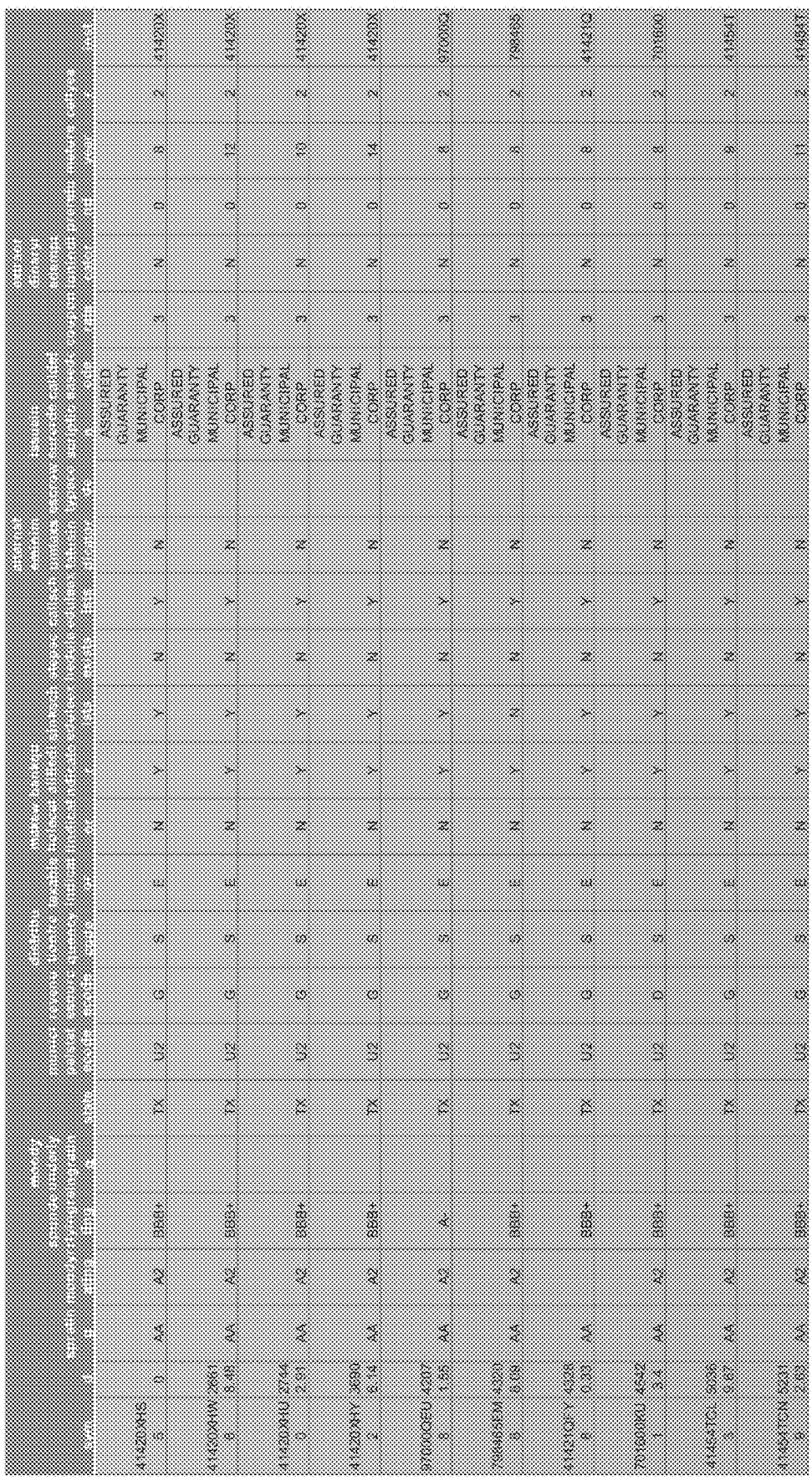
FIGURE 16: ANDSE SCREENSHOT

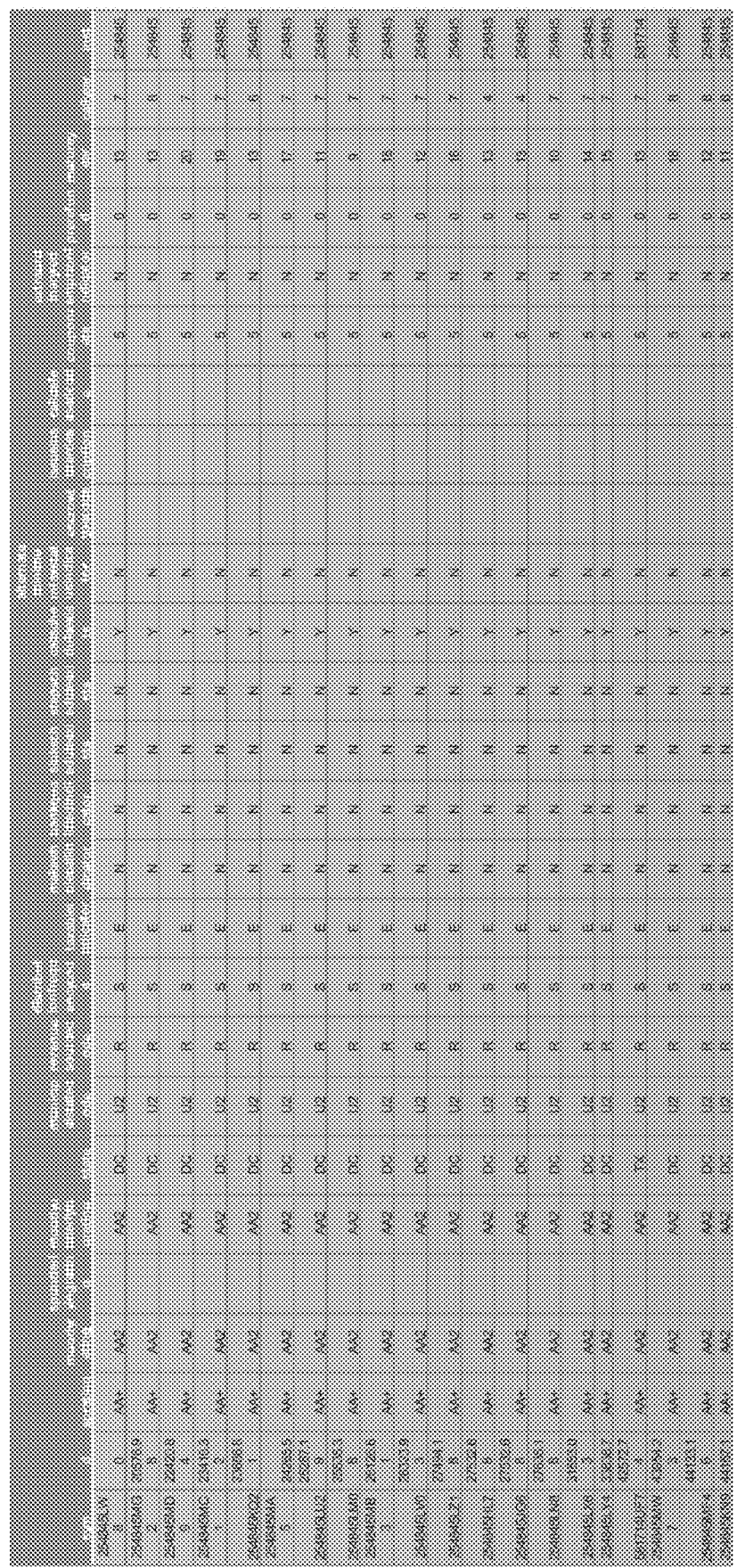
FIGURE 17: ANDSE SCREENSHOT

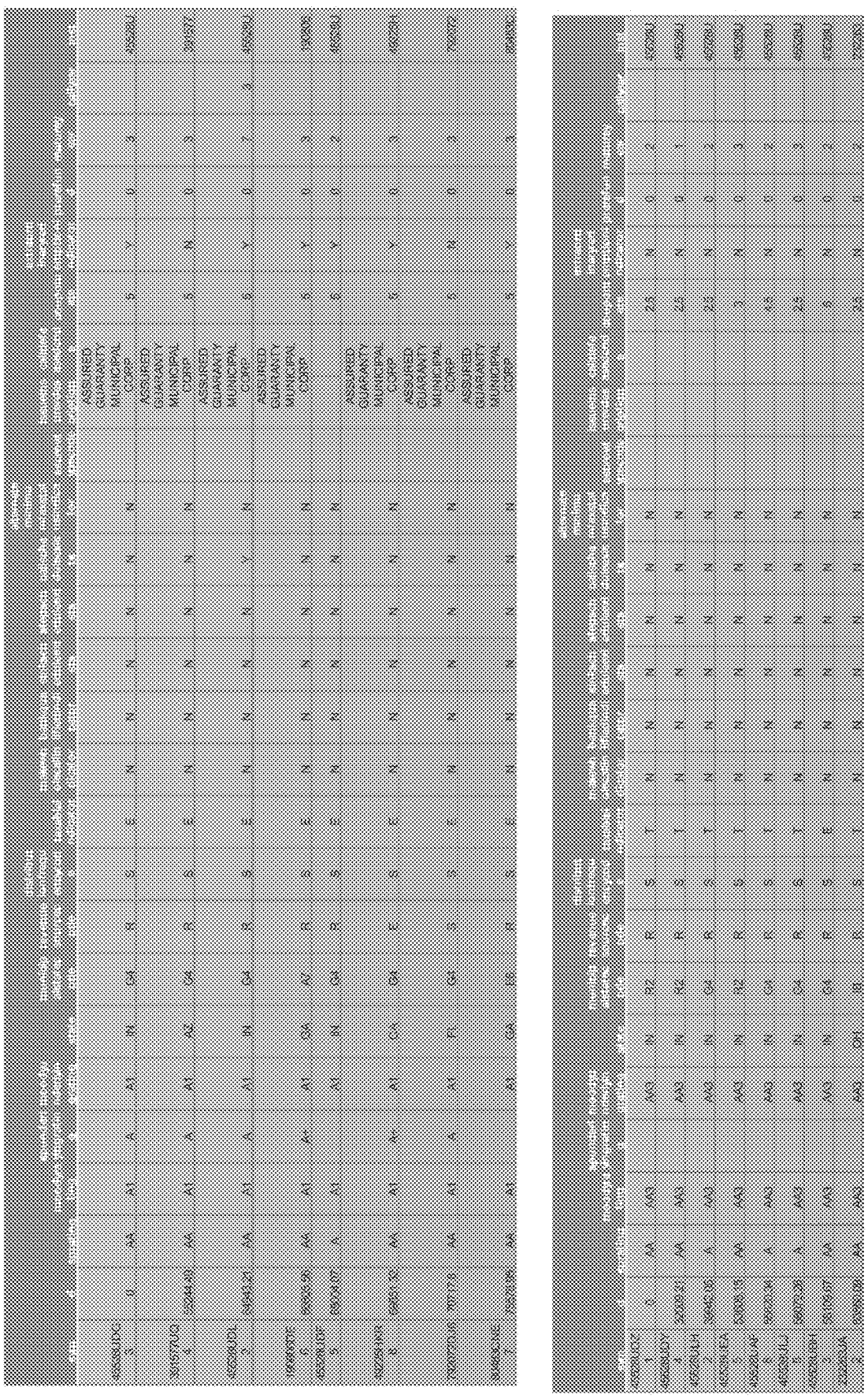
FIGURE 18: ANDSE SCREENSHOT

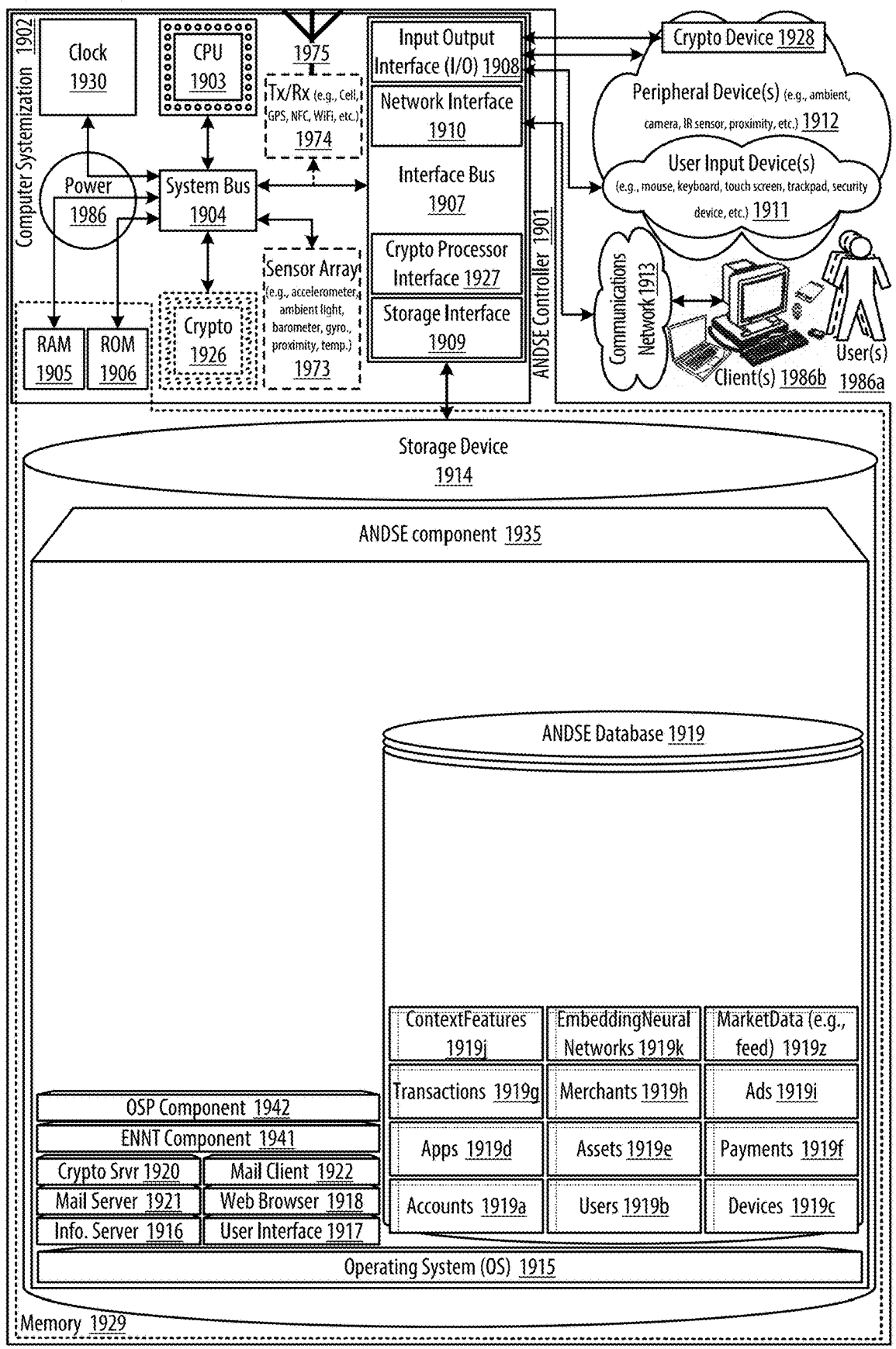
FIGURE 19: ANDSE Controller

AI-BASED NEIGHBOR DISCOVERY SEARCH ENGINE APPARATUSES, METHODS AND SYSTEMS

PRIORITY CLAIM

Applicant hereby claims benefit to priority under 35 USC § 119 as a non-provisional conversion of: U.S. provisional patent application Ser. No. 62/669,929, filed May 10, 2018, entitled "Consistency Datastructure Pruning Apparatuses, Methods and Systems".

The entire contents of the aforementioned application are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address search engines, and more particularly, include AI-Based Neighbor Discovery Search Engine Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C.

BACKGROUND

A variety of search engines are available to users. For example, Google allows users to input a search query and returns relevant web pages based on the content of the query and PageRank scores of crawled web pages.

BRIEF DESCRIPTION OF THE DRAWINGS

Appendices and/or drawings illustrating various, non-limiting, example, innovative aspects of the AI-Based Neighbor Discovery Search Engine Apparatuses, Methods and Systems (hereinafter "ANDSE") disclosure, include:

FIG. 1 shows a datagraph illustrating data flow(s) for the ANDSE;

FIG. 2 shows a logic flow illustrating embodiments of an embedding neural network training (ENNT) component for the ANDSE;

FIG. 3 shows a logic flow illustrating embodiments of an object search processing (OSP) component for the ANDSE;

FIG. 4 shows a screenshot diagram illustrating embodiments of the ANDSE;

FIG. 5 shows a screenshot diagram illustrating embodiments of the ANDSE;

FIG. 6 shows a screenshot diagram illustrating embodiments of the ANDSE;

FIG. 7 shows a screenshot diagram illustrating embodiments of the ANDSE;

FIG. 8 shows a screenshot diagram illustrating embodiments of the ANDSE;

FIG. 9 shows a screenshot diagram illustrating embodiments of the ANDSE;

FIG. 10 shows a screenshot diagram illustrating embodiments of the ANDSE;

FIG. 11 shows a screenshot diagram illustrating embodiments of the ANDSE;

FIG. 12 shows a screenshot diagram illustrating embodiments of the ANDSE;

FIG. 13 shows a screenshot diagram illustrating embodiments of the ANDSE;

FIG. 14 shows a screenshot diagram illustrating embodiments of the ANDSE;

FIG. 15 shows a screenshot diagram illustrating embodiments of the ANDSE;

FIG. 16 shows a screenshot diagram illustrating embodiments of the ANDSE;

FIG. 17 shows a screenshot diagram illustrating embodiments of the ANDSE;

FIG. 18 shows a screenshot diagram illustrating embodiments of the ANDSE;

FIG. 19 shows a block diagram illustrating embodiments of a ANDSE controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The AI-Based Neighbor Discovery Search Engine Apparatuses, Methods and Systems (hereinafter "ANDSE") transforms embedding neural network training request, object search request inputs, via ANDSE components (e.g., ENNT, OSP, etc. components), into embedding neural network response, object search response outputs. The ANDSE components, in various embodiments, implement advantageous features as set forth below.

Introduction

The ANDSE provides unconventional features (e.g., a neural network that calculates embeddings for contexts, using distances between embeddings to find neighboring contexts) that were never before available in search engines.

In various embodiments, the ANDSE may facilitate searching through contexts (e.g., objects that include a set of features that can take on various values) to find neighboring contexts (e.g., contexts with similar features). For example, contexts may be objects that describe items such as bonds (e.g., features may include rating, coupon rate, etc.), real estate listings (e.g., features may include the number of bathrooms, location, etc.), vehicles (e.g., features may include model, make, etc.), and/or the like. In some implementations, the ANDSE may utilize unsupervised learning to generate a neural network that calculates embeddings for contexts, and may find neighboring contexts using distances (e.g., Cosine distance and/or Euclidean distance) between embeddings.

As an illustrative example, the ANDSE may be utilized to determine bond similarity Each bond has a number of attributes that affect its price. It is difficult to find a systematic way to navigate through these attributes to find a bond that is similar in pricing terms. The ANDSE's AI-based search engine may be utilized to find embeddings to automatically and systematically find bonds that relate to each other. Currently, most bond similarity is done by rule-based search. The ANDSE provides an improved search engine that trains a neural network to create embeddings that describe bonds and utilizes distance between each item to determine bond similarity. In some implementations, for bonds, underlying properties of a CUSIP (e.g., based on MSRB data) lead to creation of a multi-hot vector as an input to training a neural network.

ANDSE

FIG. 1 shows a datagraph illustrating data flow(s) for the ANDSE. In FIG. 1, an administrative client 102 (e.g., of an administrator authorized to initiate training) may send an embedding neural network (NN) training request 121 to an embedding neural network training server 106 to facilitate training of a neural network that determines embeddings. For example, the administrative client may be a desktop, a laptop, a tablet, a smartphone, and/or the like that is executing a client application. In one implementation, the embedding neural network training request may include data such as a request identifier, a dataset identifier, a training period, filter criteria, similarity evaluation metrics, neural network configuration parameters, and/or the like. In one embodiment, the administrative client may provide the following example embedding neural network training request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>ANDSE.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
```

```
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <embedding_neural_network_training_request>
        <request_identifier>ID_request_1</request_identifier>
        <dataset_identifier>MSRB bond data</dataset_identifier>
        <training_period>1 day</training_period>
        <filter_criteria>
            Filter out bonds with fewer than 20 dealer-to-dealer (DD) trades
            ...
        </filter_criteria>
        <similarity_evaluation_metrics>
            <metric>ΔOAS < 10</metric>
            <metric>ΔYTM < 0.2</metric>
            <metric>ΔYTC < 0.2</metric>
            <metric>Log ΔDur < 0.25</metric>
        </similarity_evaluation_metrics>
        <neural_network_configuration_parameters>
            <input_layer>860 dimensions</input_layer>
            <hidden_layer>300 dimensions</hidden_layer>
            <embedding>8 dimensions</embedding>
            <output_layer>860 dimensions</output_layer>
            <negative_sampling>use 300 negative features</negative_sampling>
        </neural_network_configuration_parameters>
    </embedding_neural_network_training_request>
</auth_request>
```

The embedding neural network training server may send a training data request 125 to a repository 110 to obtain the specified dataset for the training period. In one implementation, the training data request may be a set of MySQL database commands similar to the following:

```
SELECT *
FROM ContextFeatures
WHERE EXISTS (SELECT cusip FROM MSRB_bond_data) AND
    date = '2020-01-10' AND
    DD_trades >= 20;
```

The repository may send a training data response 129 to the embedding neural network training server with the requested training data.

An embedding neural network training (ENNT) component 133 may utilize the training data to train an embedding neural network that determines embeddings for contexts. See FIG. 2 for additional details regarding the ENNT component.

The embedding NN training server may send an embedding NN store request 137 to the repository to store the trained embedding NN. In one implementation, the embedding NN store request may include data such as a request identifier, a request type, an embedding NN identifier, embedding neural network data (e.g., weights), and/or the like. In one embodiment, the embedding NN training server may provide the following example embedding NN store request, substantially in the form of a HTTP(S) POST message including XML-formatted data, as provided below:

```
POST /embedding_NN_store_request.php HTTP/1.1
Host: www.server.com
Content-Type: Application/XML
Content-Length: 667
<?XML version = "1.0" encoding = "UTF-8"?>
<embedding_NN_store_request>
    <request_identifier>ID_request_2</request_identifier>
    <request_type>STORE</request_type>
    <embedding_NN_identifier>ID_eNN_1
    </embedding_NN_identifier>
    <embedding_NN_data>weights of W₁, W₂, b₁,
    b₂</embedding_NN_data>
</embedding_NN_store_request>
```

The repository may send an embedding NN store response 141 to the embedding NN training server to confirm that the trained embedding NN was stored successfully. In one implementation, the embedding NN store response may include data such as a response identifier, a status, and/or the like. In one embodiment, the repository may provide the following example embedding NN store response, substantially in the form of a HTTP(S) POST message including XML-formatted data, as provided below:

```
POST /embedding_NN_store_response.php HTTP/1.1
Host: www.server.com
Content-Type: Application/XML
Content-Length: 667
<?XML version = "1.0" encoding = "UTF-8"?>
<embedding_NN_store_response>
    <response_identifier>ID_response_2</response_identifier>
    <status>OK</status>
</embedding_NN_store_response>
```

The embedding NN training server may send an embedding NN training response 145 to the administrator. The embedding NN training response may be used to inform the administrator that training was completed successfully. For example, the embedding NN training response may be provided via TensorFlow.

A user client 104 (e.g., of a user wishing to execute a search) may send an object search request 149 to a search processing server 108 to facilitate execution of the search using the embedding neural network. For example, the user client may be a desktop, a laptop, a tablet, a smartphone, and/or the like that is executing a client application. In one implementation, the object search request may include data such as a request identifier, a context (e.g., a search query such as a CUSIP of a bond), a search period, and/or the like. In one embodiment, the user client may provide the following example object search request, substantially in the form of a HTTP(S) POST message including XML-formatted data, as provided below:

```
POST /object_search_request.php HTTP/1.1
Host: www.server.com
Content-Type: Application/XML
Content-Length: 667
<?XML version = "1.0" encoding = "UTF-8"?>
<object_search_request>
    <request_identifier>ID_request_11</request_identifier>
    <context>00344NSF2</context>
    <search_period>last 5 trading days</search_period>
</object_search_request>
```

The search processing server may send an embedding NN retrieve request 153 to the repository to retrieve the trained embedding NN. In one implementation, the embedding NN retrieve request may include data such as a request identifier, a request type, an embedding NN identifier, and/or the like. In one embodiment, the search processing server may provide the following example embedding NN retrieve request, substantially in the form of a HTTP(S) POST message including XML-formatted data, as provided below:

```
POST /embedding_NN_retrieve_request.php HTTP/1.1
Host: www.server.com
Content-Type: Application/XML
Content-Length: 667
<?XML version = "1.0" encoding = "UTF-8"?>
<embedding_NN_retrieve_request>
    <request_identifier>ID_request_12</request_identifier>
    <request_type>RETRIEVE</request_type>
    <embedding_NN_identifier>ID_eNN_1
    </embedding_NN_identifier>
</embedding_NN_retrieve_requests>
```

The repository may send an embedding NN retrieve response 157 to the search processing server with the requested embedding neural network data. In one implementation, the embedding NN retrieve response may include data such as a response identifier, embedding neural network data (e.g., weights), and/or the like. In one embodiment, the repository may provide the following example embedding NN retrieve response, substantially in the form of a HTTP(S) POST message including XML-formatted data, as provided below:

```
POST /embedding_NN_retrieve_response.php HTTP/1.1
Host: www.server.com
Content-Type: Application/XML
Content-Length: 667
<?XML version = "1.0" encoding = "UTF-8"?>
<embedding_NN_retrieve_response>
    <response_identifier>ID_response_12</response_identifier>
    <embedding_NN_data>weights of $W_1$, $W_2$, $b_1$,
    $b_2$</embedding_NN_data>
</embedding_NN_retrieve_response>
```

An object search processing (OSP) component 161 may utilize the embedding neural network to facilitate execution of the search (e.g., to find other objects similar to the context). See FIG. 3 for additional details regarding the OSP component.

The search processing server may send an object search response 165 to the user. The object search response may be used to provide the user with the results of the search (e.g., a list of bonds that are similar to the context, a price for the context determined based on prices of similar bonds). For example, the object search response may be displayed using an ANDSE website, application (e.g., a mobile app), and/or the like.

FIG. 2 shows a logic flow illustrating embodiments of an embedding neural network training (ENNT) component for the ANDSE. In FIG. 2, an embedding neural network (NN) training request may be obtained at 201. For example, the embedding NN training request may be obtained as a result of an administrator initiating training of an embedding neural network.

A training period for training the embedding NN may be determined at 205. For example, the training period (e.g., one day) may determine which training data is used to train the embedding NN. In one implementation, the embedding NN training request may be parsed (e.g., using PHP commands) to determine the training period. In another implementation, a setting associated with the embedding NN may specify the training period.

Training data for the training period may be obtained at 209. For example, the training data may be data regarding bonds that traded during the training period (e.g., during the previous one trading day). In one implementation, the training data may be retrieved from a repository via a training data request. See FIG. 4 for an example of bond training data that may be obtained.

The training data may be filtered at 213. For example, filtering the training data may help to deal with noise in the training data and/or may help to reduce data errors. In one implementation, the training data may be filtered based on a type filter (e.g., to select contexts of a certain type such as bonds, real estate listings, vehicles, etc.). In another implementation, the training data may be filtered based on context-specific criteria, such as the number of associated transactions (e.g., to select bonds with at least 20 dealer-to-dealer trades during the training period).

Sample similarity evaluation metrics may be determined at 217. In one embodiment, the sample similarity evaluation metrics may determine how to evaluate whether two contexts are similar. For example, two bonds may be considered similar if: (1) the difference between their option-adjusted spread (OAS) is less than 10, (2) the difference between their yield to maturity (YTM) is less than 0.2, (3) the difference between their yield to cost (YTC) is less than 0.2, and (4) the Log of the difference between their duration is less than 0.25. In one implementation, the embedding NN training request may be parsed (e.g., using PHP commands) to determine the sample similarity evaluation metrics. In another implementation, a setting associated with the embedding NN may specify the sample similarity evaluation metrics.

A determination may be made at 221 whether there remain contexts to analyze. In one implementation, each context in the filtered training data may be analyzed. If there remain contexts to analyze, the next context may be selected at 225.

Positive target samples for the selected context may be determined using the sample similarity evaluation metrics at 229. In one implementation, other contexts in the filtered training data may be evaluated with respect to the selected context using the sample similarity evaluation metrics and those that satisfy the sample similarity evaluation metrics may be marked as positive target samples for the selected context.

A determination may be made at 233 whether the number of the determined positive target samples exceeds a threshold (e.g., 80 samples). If so, a subset of the determined positive target samples may be selected as positive target samples for the selected context at 237. For example, 80 samples from the determined positive target samples may be randomly selected to be positive target samples for the selected context.

A (selected context, positive target sample) pair may be added as a training example for the embedding NN for each of the positive target samples for the selected context at 241.

If there are no more contexts to analyze, configuration parameters of the embedding NN may be determined at 251. In one embodiment, the embedding NN may be trained using unsupervised learning. Unlike in supervised learning, where a function f( ) is estimated to fit Y=f(X), where input X and output Y are taken from data, no such output Y may be available for contexts (e.g., for bonds). Instead, unsupervised learning allows us to find relationships between input X's through a form of clustering approach. See FIG. 11 for an example visualization of bond clustering. In one implementation, the embedding NN training request may be parsed (e.g., using PHP commands) to determine the configuration parameters. In another implementation, a setting associated with the embedding NN may specify the configuration parameters. For example, the configuration parameters may specify that the embedding NN should have an 860-dimensional input layer, a 300-dimensional hidden layer, an 8-dimensional embedding layer, and an 860-dimensional output layer. In another example, the configuration parameters may specify that the embedding NN should use 300 negative features during backpropagation per negative sampling. See FIGS. 8 and 9 for examples of configuration parameters that may be specified for the embedding NN.

A determination may be made at 255 whether to continue training of the embedding NN. In one embodiment, the embedding NN may be trained using TensorFlow machine learning framework. In one implementation, the embedding NN may be trained until the training loss and/or the validation loss reach specified thresholds. In another implementation, the embedding NN may be trained for a specified number (e.g., 5) of epochs (e.g., an iteration over the set of training examples). See FIG. 10 for an example of how training of the embedding NN may progress. If training of the embedding NN should continue, the next training example may be selected at 259. In some implementations, the embedding NN may be trained using batches of training examples (e.g., the next batch of 100 training examples may be selected).

A context feature vector for the context of the selected (context, target) training example may be generated at 263. In one embodiment, a set of context features may be selected for use with the embedding NN and their possible values may be determined. See FIG. 5 for an example of context features that may be selected for bonds and their possible values. For example, a set of 29 features may be selected with a total of 860 possible values. Each of the 29 features may take on one of the possible values for the respective feature (e.g., sprating may take on one of 23 possible values such as A, A+, A−, etc.; couponrate may take on one of 103 possible values such as 0, 0.1, 0.2, etc.). A context feature vector may identify which 29 of the 860 possible values are associated with the context. In one implementation, a context feature vector may be a zero-one vector that identifies positive feature values (e.g., values associated with the context) with a 1 and negative feature values (e.g., values not associated with the context) with a 0. For example, such 860-dimensional context feature vector may allocate vector indices 0 through 22 for sprating such that 1 of the 23 indices may be a 1 and the rest 0's, may allocate vector indices 23 through 53 for monodyrating such that 1 of the 31 indices may be a 1 and the rest 0's, and so on for each of the 29 features. A context feature vector for the context may be generated by analyzing feature values associated with the context (e.g., sprating, couponrate, etc. values for a bond) and setting vector indices in the context feature vector associated with matching feature values to 1's and the rest to 0's. In another implementation, a context feature vector may be a numerical vector that identifies positive feature values. For example, such a 29-dimensional context feature vector may list 29 indices into the 860-dimensional zero-one vector associated with matching feature values. The generated context feature vector (e.g., an 860-dimensional zero-one vector) may be set as embedding NN input at 267.

A target feature vector for the target of the selected (context, target) training example may be generated at 271. In one implementation, a target feature vector may be a zero-one vector that identifies positive feature values (e.g., values associated with the target) with a 1 and negative feature values (e.g., values not associated with the target) with a 0. A target feature vector for the target may be generated by analyzing feature values associated with the target (e.g., sprating, couponrate, etc. values for a bond) and setting vector indices in the target feature vector associated with matching feature values to 1's and the rest to 0's. In another implementation, a target feature vector may be a numerical vector that identifies positive feature values. The generated target feature vector (e.g., an 860-dimensional zero-one vector) may be set as embedding NN output at 275.

A subset of the negative target features from the target feature vector may be selected at 279. In one implementation, the subset of negative target features may be selected randomly. For example, 300 features may be randomly selected out of 831 negative features (860 features−29 positive features=831 negative features). In another implementation, the probability that a negative target feature is selected may be based on the frequency with which the negative target feature is present in the training examples (e.g., the more frequently the negative target feature is present in the training examples, the more likely it may be to be selected). It is to be understood that a different subset of the negative target features may be selected for the same training example in different epochs.

embedding NN has been trained in TensorFlow, weights of $W_1$, $W_2$, $b_1$, $b_2$ may be extracted and saved in a comma-separated values (CSV) file format as illustrated below:

```
with tf.Session(graph=train_graph) as sess:
    w1e=sess.run(w1)
    b1e=sess.run(b1)
    w2e=sess.run(w2)
    b2e=sess.run(b2)
np.savetxt(dpath+'/w1.csv',w1e, delimiter=",")
np.savetxt(dpath+'/b1.csv',b1e, delimiter=",")
np.savetxt(dpath+'/w2.csv',w2e, delimiter=",")
np.savetxt(dpath+'/b2.csv',b2e, delimiter=",")
Example of W1 (Matrix of 860 × 300, truncated below)
 0.08356413    0.1519185    0.5424381   0.4800171    0.5635582    0.4213533    0.439858..
 0.7834864   −0.2162067   −0.558558   −0.2723457   −0.226466   −0.4513815   −0.73054..
−0.4344673    0.6014106   −0.6180444   0.7922392   −0.1249213  −0.1235805    0.607015..
−0.3555369    0.7841693   −0.2278593   0.9399288    0.7591099    0.6237144    0.730295..
−0.217412     0.3288579   −0.6697593  −0.3215544   −0.06746244 −0.8862395   −0.89437..
 0.4882617   −0.09349997  −0.4386618   0.102376    −0.6503484   0.2806816    0.668235..
−0.1245132   −0.2132638   1.140743    0.5514172   −0.337368    0.3294967   −0.52433..
−0.06292713  −0.3883156   −0.5374872  −0.1495091   0.107076    0.01627889   0.023105..
−0.3218832    0.7254923   −0.2622223  −0.6328102  −0.4393776   0.5510435   −0.59297..
 0.2735285   −0.3100706    0.1704787   0.349503   −0.5897876  −0.3064147    0.003352..
−0.08980551   0.45724     −0.7248968  −0.3989227  −1.061386   −0.6696594    0.685963..
−0.320273    −0.4416768    0.2421721  −0.340791   −0.4234989   0.6610322   −0.76552..
Example of W2 (Matrix of 300 × 8, truncated below)
−0.5005789   −0.3327808    0.2532243   0.3974574  −0.232923   −0.4396975    0.101..
−0.5634206   −0.01508505   0.5033864   0.7403437  −0.7375205  −0.6877401   −0.32..
 0.4886091   −0.7417306   −0.02404513  0.3306553  −0.7611618  −0.2799678   −0.07..
 0.09604248  −0.07240769   0.01656507 −0.3692047  −0.5520926  −0.5606579    0.499..
 0.510244    −0.3233339   −0.2553729   0.1287736   0.5410922   0.1772909    0.464..
 0.1244391    0.4464391   −0.5162037   0.144859    0.1551512   0.06261889   0.375..
−0.2759107    0.3783541    0.1310261   0.2016945  −0.2673226   0.08148765  −0.88..
−0.5732635   −0.02177642   0.7302969   0.1759774  −0.2207347   0.2778569    0.053..
−0.66742      0.7535982    0.3064223   0.1450411   0.6121141   0.376051     0.195..
−0.4641006   −0.357753    −0.4321671  −0.1598055   0.7014824   0.3315346   −0.85..
 0.3793766   −0.03485274  −0.7762316  −0.2566821  −0.7497072   0.2502804    0.512..
−0.1973598    0.2579195   −0.12255    −0.03419422 −0.6559544  −0.03842305  −0.01..
 0.428311     0.1441375   −0.1538858   0.8664753  −0.1757044  −0.1086247   −0.63..
−0.0924723    0.582389    −0.06183467 −0.5758387  −0.5895003   0.7691935   −0.71..
−0.5682127   −0.045364    −0.351716   −0.211815    0.801193   −0.004509993 −0.05..
−0.2312685   −0.6351991    0.1296641   0.08448321  0.4808676  −0.2071982   −0.39..
 0.2434188    0.2934225    0.6386202   0.6378067   0.3255225   0.7301647    0.111..
−0.3840389    0.9541497    0.3893478   0.4473244   0.01065338 −0.7698551   −0.53..
Example of b1 (list of 300 elements, truncated below)
 0.05297507   0.1165409    0.1275992   0.08235155 −0.09815235  0.05664315  −0.2215466 −..
Example of b2 (list of 8 elements, truncated below)
−0.00511852  −0.01687565  −0.02014649 −0.01170683 −0.02558751  0.01377251  −0.002..
```

The embedding NN may be trained using the training example at 283. In one embodiment, the embedding NN may be trained using backpropagation per negative sampling. The use of negative sampling may reduce the computational complexity and/or improve the quality of the resultant embedding NN. In negative sampling, instead of adjusting all weights during the backpropagation step, a subset of weights is adjusted for the output layer. For example, weights for 329 features (29 positive features+300 negative features=329 features) out of 860 features may be adjusted. In one implementation, TensorFlow's tf.nn.sampled_softmax_loss loss function may be utilized to implement negative sampling. It is to be understood that a variety of other implementations may be utilized to leverage negative sampling in the training of the embedding NN. In one embodiment, the embedding NN is trained to generate embeddings. In one implementation, an embedding may be a low dimensional (e.g., 8-dimensional) vector, as compared to the dimensionality of contexts (e.g., at least an order of magnitude lower), that facilitates comparison of contexts based on distance (e.g., Cosine distance and/or Euclidean distance).

Once the embedding NN has been trained, the embedding NN may be stored at 287. In one implementation, after the FIG. 3 shows a logic flow illustrating embodiments of an object search processing (OSP) component for the ANDSE. In FIG. 3, an object search request for a context may be obtained at 301. In various implementations, contexts may be objects that describe items such as bonds, real estate listings, vehicles, and/or the like. For example, the object search request may be obtained as a result of a user initiating a search for contexts similar to the specified context.

An embedding neural network (NN) associated with the object search request may be retrieved at 305. For example, if the specified context is a bond, an embedding NN associated with bonds may be retrieved. In one implementation, the embedding NN to retrieve may be specified in a configuration setting. In another implementation, the embedding NN to retrieve may be determined based on analysis of the search query provided in the object search request (e.g., if the context in the object search request is 00344NSF2, the format of the context may be analyzed to determine that it is a bond CUSIP and an embedding NN used for bonds may be retrieved). For example, the embedding NN may be retrieved via a set of MySQL database commands similar to the following:

```
SELECT W₁, W₂, b₁, b₂
FROM EmbeddingNeuralNetworks
WHERE eNN_ID = ID_eNN_1;
```

A context feature vector for the context may be generated at 309. In one implementation, a context feature vector may be a zero-one vector that identifies positive feature values (e.g., values associated with the context) with a 1 and negative feature values (e.g., values not associated with the context) with a 0. A context feature vector for the context may be generated by analyzing feature values associated with the context (e.g., sprating, couponrate, etc. values for a bond) and setting vector indices in the context feature vector associated with matching feature values to 1's and the rest to 0's.

An embedding for the context may be determined at 313. In one implementation, the embedding (e.g., 8-dimensional) for the context may be determined using the retrieved embedding NN. For example, the embedding for the context may be calculated in accordance with the following formula:

```
Embedding e=hW₂+b₂
where:
    h=ReLU(xW₁+b₁)
where:
    ReLU is a rectified linear unit and
    x is a context feature vector (e.g., an 860-dimensional zero-one
       vector)
```

A search period associated with the object search request may be determined at 317. For example, the search period may determine a dataset of contexts that may be searched through. In one implementation, the search period may be specified in a configuration setting (e.g., bond data from the previous 5 trading days D-5 to D-1). In another implementation, the user may specify the search period via the object search request.

Search data for the search period may be obtained at 321. In one implementation, the search data may be retrieved via a set of MySQL database commands similar to the following:

```
SELECT *
FROM ContextFeatures
WHERE EXISTS (SELECT cusip FROM MSRB_bond_data) AND
    date >= '2020-01-05' AND
    date <= '2020-01-09';
```

In another implementation, the search data may be retrieved as follows:

Get Security Master Reference for a date (d) and convert to numerical feature values
ref: getref[d];
Example of ref:

| sym | 207915QL6 | 234686CK7 | 786110KL9 | 548573AR5 | 273389JU1 | 41420XHS5 |
|---|---|---|---|---|---|---|
| sprating | 0 | 21 | 21 | 10 | 9 | 7 |
| moodyrating | 23 | 53 | 46 | 46 | 23 | 25 |
| spunderlyingrating | 54 | 54 | 58 | 54 | 54 | 69 |
| moodyunderlyingrating | 75 | 75 | 75 | 75 | 75 | 75 |
| state | 142 | 142 | 142 | 142 | 124 | 147 |
| underlyingstate | 163 | 202 | 161 | 196 | 180 | 202 |
| sector | 278 | 225 | 275 | 272 | 220 | 272 |
| revenuesourcecode | 299 | 299 | 291 | 299 | 293 | 293 |
| distributionfrequencycode | 309 | 309 | 309 | 309 | 309 | 309 |
| taxableindicator | 312 | 312 | 312 | 312 | 312 | 312 |
| makewholecallindicator | 315 | 314 | 315 | 314 | 315 | 315 |
| bankqualifiedindicator | 318 | 318 | 318 | 320 | 318 | 320 |
| sinkscheduleexists | 321 | 322 | 322 | 322 | 321 | 322 |
| stepscheduleexists | 323 | 323 | 323 | 323 | 323 | 323 |
| callscheduleexists | 326 | 326 | 326 | 326 | 326 | 326 |
| alternateminimumtaxstatusindicator | 327 | 327 | 327 | 327 | 327 | 327 |
| escrowmaturityindicatory | 329 | 329 | 329 | 329 | 329 | 329 |
| escrowtypecode | 332 | 333 | 333 | 333 | 331 | 331 |
| issueinsurercode | 349 | 358 | 391 | 391 | 349 | 356 |
| calldefeasedcode | 427 | 427 | 427 | 427 | 427 | 427 |
| extraordinaryredemptionindicator | 432 | 432 | 433 | 432 | 432 | 432 |
| refundtypecode | 442 | 442 | 442 | 442 | 434 | 434 |
| coupontype | 449 | 449 | 449 | 449 | 449 | 449 |
| maturitydate | 457 | 466 | 469 | 465 | 503 | 488 |
| nextcalldate | 550 | 559 | 562 | 558 | 584 | 557 |
| worstdate | 643 | 652 | 655 | 651 | 677 | 650 |
| couponrate | 785 | 785 | 785 | 790 | 785 | 765 |
| issuesize | 842 | 842 | 842 | 842 | 842 | 842 |
| taxrate | 853 | 844 | 859 | 845 | 847 | 844 |

A determination may be made at 325 whether there remain search objects (e.g., other contexts) to analyze. In one implementation, each search object in the search data may be analyzed. If there remain search objects to analyze, the next search object may be selected at 329.

A search object feature vector may be generated at 333. In one implementation, a search object feature vector may be a zero-one vector that identifies positive feature values (e.g., values associated with the search object) with a 1 and negative feature values (e.g., values not associated with the search object) with a 0. For example, search object feature vectors may be generated for the search data as follows:

| | |
|---|---|
| Convert numerical feature values into zero-one vectors | |
| data: convert_to_vector[ref] | |
| Example: | |
| sym | fv |
| 00344NJX3 | 00000000100000000000001000000 . . . (860 dimensions, truncated) |
| 00344NTM6 | 00000000100000000000001000000 . . . |
| 004284ZH1 | 00000001000000000000000000100 . . . |
| 0054823G7 | 10000000000000000000000000010 . . . |
| 005596DV0 | 00000001000000000000000000010 . . . |
| 005596EH0 | 00000001000000000000000000010 . . . |

An embedding for the search object may be determined at 337. In one implementation, the embedding (e.g., 8-dimensional) for the search object may be determined using the retrieved embedding NN. For example, embeddings may be calculated for the search data as follows:

```
Compute embeddings
// Take rows of W₁ where symbol feature has 1 value, sum them over
// Add bias b₁ to the result, and then take the max of the value and zero.
// Multiply result with matrix W₂, and then add bias b₂ to create embedding
update emb: {b2+sum w2*0f|b1+sum w1 where x}'[fv] from data
```

Example:
| sym | fv | emb |
|---|---|---|
| 00344NJX3 | 00000000100000000000001000000 . . . | −3.8, 0.8 −2.1, 2.9, 2, 1.7, −5, −1.8 |
| 00344NTM6 | 00000000100000000000001000000 . . . | 0.5, −3.6, −1, 4.2, −1.3, 1.5, −2.6, −4.5 |
| 004284ZH1 | 00000001000000000000000000100 . . . | −1.8, −0.4, −8.1, 7.4, −3.6, 14.7, −7.3, −3.5 |
| 0054823G7 | 10000000000000000000000000010 . . . | 1.6, −4.5, −2.3, 4.3, −0.1, 1.1, −3, −5.6 |
| 005596DV0 | 00000001000000000000000000010 . . . | −3.8, 0.7, 0.3, 3.4, 2.9, 1.4, −5.3, −1.6 |
| 005596EH0 | 00000001000000000000000000010 . . . | 0, −3.1, 1, 4, −2.5, 3.7, −1, −4.1 |

A context embedding to search object embedding Cosine Distance may be calculated at 341. For example, the context embedding to search object embeddings Cosine Distances may be calculated as follows:

Generally, Cosine Distance between embeddings A and B is defined by $$\text{Cosine Distance} = \frac{A \cdot B}{\|A\|\|B\|}$$

Step 1: Compute Norm of Each Embedding

| | |
|---|---|
| update norm: {sqrt sum sqr x}'[emb] from data | |

Example:
| sym | emb | norm |
|---|---|---|
| 00344NJX3 | −3.8, 0.8, −2.1, 2.9, 2, 1.7, −5, −1.8 | 7.92578 |
| 00344NTM6 | 0.5, −3.6, −1, 4.2, −1.3, 1.5, −2.6, −4.5 | 7.948063 |
| 004284ZH1 | −1.8, −0.4, −8.1, 7.4, −3.6, 14.7, −7.3, −3.5 | 20.48779 |
| 0054823G7 | 1.6, −4.5, −2.3, 4.3, −0.1, 1.1, −3, −5.6 | 9.395664 |
| 005596DV0 | −3.8, 0.7, 0.3, 3.4, 2.9, 1.4, −5.3, −1.6 | 8.18653 |
| 005596EH0 | 0, −3.1, 1, 4, −2.5, 3.7, −1, −4.1 | 8.005304 |

Step 2: Compute Dot-Product of A·B for Every Pair of Embeddings

| | |
|---|---|
| Let emb be the embedding matrix (value in previous table) | |
| ab: mmu[emb; flip emb] (matrix multiplication of emb and transpose of emb) | |
| Example: result of ab given 6 pair wise comparisons from table above | |

| | | | | | |
|---|---|---|---|---|---|
| 62.81799 | 30.44921 | 104.7238 | 34.32184 | 61.3029 | 19.79072 |
| 30.44921 | 63.1717 | 101.26 | 72.47577 | 28.96091 | 56.58779 |
| 104.7238 | 101.26 | 419.7494 | 108.0231 | 83.00734 | 107.6787 |
| 34.32184 | 72.47577 | 108.0231 | 88.27849 | 30.78979 | 58.97134 |
| 61.3029 | 28.96091 | 83.00734 | 30.78979 | 67.01927 | 21.01667 |
| 19.79072 | 56.58779 | 107.6787 | 58.97134 | 21.01667 | 64.08489 |

Step 3: Compute Cosine Distance

| | |
|---|---|
| //Divide each row using the norm, and then divide each column using the norm | |
| cdist: (ab %' exec norm from data) %\: (exec norm from data) | |
| Example: | |

| | | | | | |
|---|---|---|---|---|---|
| 1 | 0.4833622 | 0.6449235 | 0.460894 | 0.9447984 | 0.3119189 |
| 0.4833622 | 1 | 0.621844 | 0.9705191 | 0.4450934 | 0.8893723 |
| 0.6449235 | 0.621844 | 1 | 0.5611695 | 0.4949048 | 0.6565336 |
| 0.460894 | 0.9705191 | 0.5611695 | 1 | 0.4002944 | 0.7840354 |
| 0.9447984 | 0.4450934 | 0.4949048 | 0.4002944 | 1 | 0.3206907 |
| 0.3119189 | 0.8893723 | 0.6565336 | 0.7840354 | 0.3206907 | 1 |

Note that diagonal Cosine Distance = 1. That is, if A = B, the distance = 1. The bigger the Cosine Distance, the more similar the two contexts (e.g., bonds).

A context embedding to search object embedding Euclidean Distance may be calculated at 345. For example, the context embedding to search object embeddings Euclidean Distances may be calculated as follows:

Generally, Euclidean Distance of embedding A and B can be computed by $$\text{Euclidean Distance} = \sqrt{\|A\|^2 - 2A \cdot B + \|B\|^2}$$

Step 1: Obtain Norm and Compute Dot-Product A·B as in Cosine Distance
Step 2: Compute Euclidean Distance // add each row using square norm, and then add each column using square norm
// subtract twice of A·B, and then take square root
edist: sqrt ((neg 2*ab)+' exec sqr norm from data)+\: exec sqr norm from data Example

| 0 | 8.067916 | 16.52634 | 9.080353 | 2.689137 | 9.344595 |
|---|---|---|---|---|---|
| 8.067916 | 0 | 16.74518 | 2.549246 | 8.501126 | 3.752467 |
| 16.52634 | 16.74518 | | 17.08747 | 17.9096 | 16.38526 |
| 9.080353 | 2.549246 | 17.08747 | 0 | 9.680815 | 5.866917 |

-continued

| 2.689137 | 8.501126 | 17.9096 | 9.680815 | 0 | 9.437733 |
|---|---|---|---|---|---|
| 9.344595 | 3.752467 | 16.38526 | 5.866917 | 9.437733 | 0 |

Note that diagonal Euclidean Distance = 0. That is, if A = B, the distance = 0. The closer to zero the Euclidean Distance, the more similar the two bonds.

If there are no more search objects to analyze, the search objects may be sorted by Cosine Distance and/or Euclidean Distance at 351. For example, the search objects may be sorted from more similar to less similar In one implementation, the search objects may be sorted first by Cosine Distance (e.g., from search objects with bigger Cosine Distance to the context to those with smaller Cosine Distance) and then by Euclidean Distance (e.g., from search objects having the same Cosine Distance with smaller Euclidean Distance to the context to those with bigger Euclidean Distance).

A set of search object neighbors may be determined at 355. In one implementation, any analyzed search object may be included in the set of search object neighbors. In another implementation, the set of search object neighbors may have a maximum size (e.g., 100 search objects). For example, if the number of analyzed search objects exceeds 100, the 100 search objects most similar to the context may be included in the set of search object neighbors. In another implementation, the set of search object neighbors may have a minimum similarity threshold (e.g., based on the Cosine Distance, based on the Euclidean Distance). For example, any search object that exceeds the minimum similarity threshold may be included in the set of search object neighbors.

A subset of closest neighbors may be added to a set of search results at 359. In one implementation, the subset of closest neighbors may comprise a specified number (e.g., 10) of search objects in the set of search object neighbors that are most similar to the context.

A distance between the context and the center of the set of search results may be calculated at 363. In one implementation, the center of the set of search results is computed by averaging each coordinate of embeddings. For example, the center of the set of search results may be calculated as follows:

As an example, if the following three neighbors are identified:

| sym | fv | emb |
|---|---|---|
| 00344NJX3 | 00000000100000000000001000000 . . . | −3.8, 0.8, −2.1, 2.9, 2, 1.7, −5, −1.8 |
| 00344NTM6 | 00000000100000000000001000000 . . . | 0.5, −3.6, −1, 4.2, −1.3, 1.5, −2.6, −4.5 |
| 004284ZH1 | 00000001000000000000000000100 . . . | −1.8, −0.4, −8.1, 7.4, −3.6, 14.7, 7.3, −3.5 |

The first coordinate of the center is computed by (−3.8 + 0.5 − 1.8)/3 = −1.70, the second coordinate of the center is computed by (0.8 − 3.6 − 0.4)/3 = −1.07, etc. Performing computing across the coordinates, we obtain the center as: −1.70, −1.07, −3.73, 4.83, −0.97, 5.97, −4.97, −3.27.

In one implementation, the distance between the context and the center of the set of search results may be computed using Euclidean Distance in an analogous way as described at 345.

A determination may be made at 367 whether there remain search object neighbors to analyze. In one implementation, each search object neighbor not in the subset of closest neighbors may be analyzed. If there remain search object neighbors to analyze, the next search object neighbor may be selected at 371.

A new distance between the context and the center of a new set of search object neighbors that includes the set of search results and the selected search object neighbor may be calculated at 375. If it is determined at 379 that the new distance with the selected search object neighbor is shorter than the current distance between the context and the center of the set of search results without the selected search object neighbor, the selected search object neighbor may be added to the set of search results at 383.

If there do not remain search object neighbors to analyze, the set of search results may be returned at 387. For example, the set of search results (e.g., the set of contexts similar to the specified context) may be returned via an object search response. In some implementations, the set of search results may be modified to eliminate bias before being returned. For example, if the contexts in the set of search results are far and/or there is an imbalance, the set of search results may be modified by considering the distribution of neighbors and/or a safety margin (e.g., if only 4-year bonds are in the set of search results for a 5-year bond, the set of search results may be modified by adding other 4, 5, and 6-year bonds). In some implementation, additional processing may be performed using the set of search results. For example, a price for a bond (e.g., the specified context) may be calculated based on the prices of the similar bonds (e.g., the contexts in the set of search results). Additional regression and gradient boosting methods can be applied to correct for factor differences between the search results and the context.

FIG. 4 shows a screenshot diagram illustrating embodiments of the ANDSE. In FIG. 4 an example of bond training data is illustrated. Each bond has a number of attributes that may affect its price. The ANDSE provides a systematic way to navigate through these attributes to find bonds that are similar in pricing terms.

FIG. 5 shows a screenshot diagram illustrating embodiments of the ANDSE. In FIG. 5 an example of context features for bonds and their possible values is illustrated. A set of 29 features is shown with a total of 860 possible values. Each of the 29 features may take on one of the possible values for the respective feature (e.g., sprating may take on one of 23 possible values such as A, A+, A−, etc.; couponrate may take on one of 103 possible values such as 0, 0.1, 0.2, etc.). The name of each feature is shown in the feature column. The possible values for each feature are shown in the val column. The number of possible values for each feature is shown in the count column.

FIG. 6 shows a screenshot diagram illustrating embodiments of the ANDSE. In FIG. 6, the block diagram illustrates an exemplary embodiment of how to determine positive target samples for a context. Table 610 illustrates an example of positive target samples determined for various contexts. Table 620 illustrates a context vector (e.g., in the format of an 860-dimensional zero-one vector) for a context (e.g., 00344NSF2) and context vectors (e.g., in the format of numerical vectors that identify positive feature values) of the associated positive target samples.

FIG. 7 shows a screenshot diagram illustrating embodiments of the ANDSE. In FIG. 7, the block diagram illustrates an exemplary embodiment of how to determine positive target samples for a context. Table 710 illustrates an example of positive target samples (e.g., the 4 above (from 150010GS9 to 89602NWR1) and 11 below (from 49151EP72 to 803820KY4)) determined for a context (e.g., 64971Q5E9).

FIG. 8 shows a screenshot diagram illustrating embodiments of the ANDSE. In FIG. 8, an exemplary configuration for an embedding neural network is illustrated. The embedding neural network is configured to have an 860-dimensional input layer (e.g., a context feature vector), a 300-dimensional hidden layer, an 8-dimensional embedding layer, and an 860-dimensional output layer (e.g., a target feature vector). Activation functions utilized for various layers are also illustrated.

FIG. 9 shows a screenshot diagram illustrating embodiments of the ANDSE. In FIG. 9, an exemplary configuration for an embedding neural network is illustrated. The embedding neural network is configured to have an >25K-dimensional input layer (e.g., a context feature vector), a 1000-dimensional hidden layer, a 300-dimensional embedding layer, and an >25K-dimensional output layer (e.g., a target feature vector). Activation functions utilized for various layers are also illustrated.

FIG. 10 shows a screenshot diagram illustrating embodiments of the ANDSE. In FIG. 10, an exemplary TensorFlow training example is illustrated. The example shows how training loss and validation loss are reduced with training.

FIG. 11 shows a screenshot diagram illustrating embodiments of the ANDSE. In FIG. 11, a visualization of bond clustering using the t-Distributed Stochastic Neighbor Embedding (t-SNE) machine learning technique is illustrated. The visualization shows how bonds with similar embeddings are clustered together.

FIG. 12 shows a screenshot diagram illustrating embodiments of the ANDSE. In FIG. 12, a validation example is illustrated. The example shows pair-wise same day evaluation using embeddings.

FIG. 13 shows a screenshot diagram illustrating embodiments of the ANDSE. In FIG. 13, a prediction example is illustrated. The example shows Cosine Distances and Euclidean Distances calculated for embeddings using historical data.

FIG. 14 shows a screenshot diagram illustrating embodiments of the ANDSE. In FIG. 14 an evaluation example is illustrated. The example shows that a generated embedding neural network provides good prediction approximately 90% of the time.

FIGS. 15-18 show screenshot diagrams illustrating embodiments of the ANDSE. In FIGS. 15-18, distance examples are illustrated. The examples show neighbors found for various contexts.

ANDSE Controller

FIG. 19 shows a block diagram illustrating embodiments of a ANDSE controller. In this embodiment, the ANDSE controller 1901 may serve to aggregate, process, store, search, serve, identify, instruct, generate, match, and/or facilitate interactions with a computer through search engines technologies, and/or other related data.

Users, which may be people and/or other systems, may engage information technology systems (e.g., computers) to facilitate information processing. In turn, computers employ processors to process information; such processors 1903 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ANDSE controller 1901 may be connected to and/or communicate with entities such as, but not limited to: one or more users from peripheral devices 1912 (e.g., user input devices 1911); an optional cryptographic processor device 1928; and/or a communications network 1913.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The ANDSE controller 1901 may be based on computer systems that may comprise, but are not limited to, components such as: a computer systemization 1902 connected to memory 1929.

Computer Systemization

A computer systemization 1902 may comprise a clock 1930, central processing unit ("CPU(s)" and/or "processor(s)" (these terms are used interchangeable throughout the disclosure unless noted to the contrary)) 1903, a memory 1929 (e.g., a read only memory (ROM) 1906, a random access memory (RAM) 1905, etc.), and/or an interface bus 1907, and most frequently, although not necessarily, are all interconnected and/or communicating through a system bus 1904 on one or more (mother)board(s) 1902 having conductive and/or otherwise transportive circuit pathways through which instructions (e.g., binary encoded signals) may travel to effectuate communications, operations, storage, etc. The computer systemization may be connected to a power source 1986; e.g., optionally the power source may be internal. Optionally, a cryptographic processor 1926 may be connected to the system bus. In another embodiment, the cryptographic processor, transceivers (e.g., ICs) 1974, and/or sensor array (e.g., accelerometer, altimeter, ambient light, barometer, global positioning system (GPS) (thereby allowing ANDSE controller to determine its location), gyroscope, magnetometer, pedometer, proximity, ultra-violet sensor, etc.) 1973 may be connected as either internal and/or external peripheral devices 1912 via the interface bus I/O 1908 (not pictured) and/or directly via the interface bus 1907. In turn, the transceivers may be connected to antenna(s) 1975, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the ANDSE controller and beyond through various interfaces. Should processing requirements dictate a greater amount speed and/or capacity, distributed processors (e.g., see Distributed ANDSE below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the ANDSE may be achieved by implementing a microcontroller such as CAST's® R8051XC2 microcontroller; Intel's® MCS 51 (i.e., 8051 microcontroller); and/or the like. Also, to implement certain features of the ANDSE, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ANDSE component collection (distributed or otherwise) and/or features may be implemented via the microprocessor and/or via embedded components; e.g., via ASIC, coprocessor, DSP, FPGA, and/or the like. Alternately, some implementations of the ANDSE may be implemented with embedded components that are configured and used to achieve a variety of features or signal processing.

Depending on the particular implementation, the embedded components may include software solutions, hardware solutions, and/or some combination of both hardware/software solutions. For example, ANDSE features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the ANDSE features. A hierarchy of programmable interconnects allow logic blocks to be interconnected as needed by the ANDSE system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the ANDSE may be developed on FPGAs and then migrated into a fixed version that more resembles ASIC implementations. Alternate or coordinating implementations may migrate ANDSE controller features to a final ASIC instead of or in addition to FPGAs. Depending on the implementation all of the aforementioned embedded components and microprocessors may be considered the "CPU" and/or "processor" for the ANDSE.

Power Source

The power source 1986 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1986 is connected to at least one of the interconnected subsequent components of the ANDSE thereby providing an electric current to all subsequent components. In one example, the power source 1986 is connected to the system bus component 1904. In an alternative embodiment, an outside power source 1986 is provided through a connection across the I/O 1908 interface. For example, a USB and/or IEEE 1394 connection carries both data and power across the connection and is therefore a suitable source of power.

Interface Adapters

Interface bus(ses) 1907 may accept, connect, and/or communicate to a number of interface adapters, variously although not necessarily in the form of adapter cards, such as but not limited to: input output interfaces (I/O) 1908, storage interfaces 1909, network interfaces 1910, and/or the like. Optionally, cryptographic processor interfaces 1927 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1909 may accept, communicate, and/or connect to a number of storage devices such as, but not limited to: storage devices 1914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1910 may accept, communicate, and/or connect to a communications network 1913. Through a communications network 1913, the ANDSE controller is accessible through remote clients 1933b (e.g., computers with web browsers) by users 1933a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed ANDSE below), architectures may similarly be employed to pool, load balance, and/or otherwise decrease/increase the communicative bandwidth required by the ANDSE controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1910 may be used to engage with various communications network types 1913. For example, multiple network interfaces may be employed to allow for the communication over broadcast, multicast, and/or unicast networks.

Input Output interfaces (I/O) 1908 may accept, communicate, and/or connect to user, peripheral devices 1912 (e.g., input devices 1911), cryptographic processor devices 1928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1912 may be connected and/or communicate to I/O and/or other facilities of the like such as network interfaces, storage interfaces, directly to the interface bus, system bus, the CPU, and/or the like. Peripheral devices may be external, internal and/or part of the ANDSE controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1911 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the ANDSE controller may be embodied as an embedded, dedicated, and/or monitor-less (i.e., headless) device, wherein access would be provided over a network interface connection.

Cryptographic units such as, but not limited to, microcontrollers, processors 1926, interfaces 1927, and/or devices 1928 may be attached, and/or communicate with the ANDSE controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1929. However, memory is a fungible technology and resource, thus, any number of memory embodiments may be employed in lieu of or in concert with one another. It is to be understood that the ANDSE controller and/or a computer systemization may employ various forms of memory 1929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 1929 will include ROM 1906, RAM 1905, and a storage device 1914. A storage device 1914 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1929 may contain a collection of program and/or database components and/or data such as, but not limited to: operating system component(s) 1915 (operating system); information server component(s) 1916 (information server); user interface component(s) 1917 (user interface); Web browser component(s) 1918 (Web browser); database(s) 1919; mail server component(s) 1921;

mail client component(s) 1922; cryptographic server component(s) 1920 (cryptographic server); the ANDSE component(s) 1935; and/or the like (i.e., collectively a component collection). These components may be stored and accessed from the storage devices and/or from storage devices accessible through an interface bus. Although unconventional program components such as those in the component collection may be stored in a local storage device 1914, they may also be loaded and/or stored in memory such as: peripheral devices, RAM, remote storage facilities through a communications network, ROM, various forms of memory, and/or the like.

Operating System

The operating system component 1915 is an executable program component facilitating the operation of the ANDSE controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ANDSE controller to communicate with other entities through a communications network 1913. Various communication protocols may be used by the ANDSE controller as a subcarrier transport mechanism for interaction, such as, but not limited to: multicast, TCP/IP, UDP, unicast, and/or the like.

Information Server

An information server component 1916 is a stored program component that is executed by a CPU. The information server may be a an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ANDSE controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ANDSE database 1919, operating systems, other program components, user interfaces, Web browsers, and/or the like.

Access to the ANDSE database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ANDSE. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the ANDSE as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 1917 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1918 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the ANDSE enabled nodes. The combined application may be nugatory on systems employing Web browsers.

Mail Server

A mail server component 1921 is a stored program component that is executed by a CPU 1903. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the ANDSE. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the ANDSE mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1922 is a stored program component that is executed by a CPU 1903. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1920 is a stored program component that is executed by a CPU 1903, cryptographic processor 1926, cryptographic processor interface 1927, cryptographic processor device 1928, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the ANDSE may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to allow the ANDSE component to engage in secure transactions if so desired. The cryptographic component facilitates the secure accessing of resources on the ANDSE and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ANDSE Database

The ANDSE database component 1919 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the ANDSE database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the ANDSE database is implemented as a data-structure, the use of the ANDSE database 1919 may be integrated into another component such as the ANDSE component 1935. Also, the database may be implemented as a mix of data structures, objects, and relational structures. Databases may be consolidated and/or distributed in countless variations (e.g., see Distributed ANDSE below). Portions of databases, e.g., tables, may be exported and/or imported and thus decentralized and/or integrated.

In one embodiment, the database component 1919 includes several tables 1919*a-z:*

An accounts table 1919*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 1919*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a ANDSE);

An devices table 1919*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1919*d* includes fields such as, but not limited to: appID, appName, appType, appDependencies, accountID, deviceID s, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1919*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1919*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payement Restrictions, and/or the like;

An transactions table 1919*g* includes fields such as, but not limited to: transactionID, accountID, assetID s, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccess Privileges, transactionPreferences, transactionRestrictions, merchantAuthKey, merchantAuthCode, and/or the like;

An merchants table 1919*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAcces sPrivileges, merchant Preferences, merchantRestrictions, and/or the like;

An ads table 1919*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A context features table 1919*j* includes fields such as, but not limited to: contextID, contextFeatureName, contextFeatureValue, date, and/or the like;

An embedding neural networks table 1919*k* includes fields such as, but not limited to: eNN_ID, eNN_ConfigurationParameters, $W_1$, $W_2$, $b_1$, $b_2$, and/or the like;

A market_data table 1919*z* includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US equity trade and quote market Data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the ANDSE database may interact with other database systems. For example, employing a distributed database system, queries and data access by search ANDSE component may treat the combination of the ANDSE database, an integrated data security layer database as a single database entity (e.g., see Distributed ANDSE below).

In one embodiment, user programs may contain various user interface primitives, which may serve to update the ANDSE. Also, various accounts may require custom database tables depending upon the environments and the types of clients the ANDSE may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 1919a-z. The ANDSE may be configured to keep track of various settings, inputs, and parameters via database controllers.

The ANDSE database may communicate to and/or with other components in a component collection, including itself, and/or facilities of the like. Most frequently, the ANDSE database communicates with the ANDSE component, other program components, and/or the like. The database may contain, retain, and provide information regarding other nodes and data.

The ANDSEs

The ANDSE component 1935 is a stored program component that is executed by a CPU. In one embodiment, the ANDSE component incorporates any and/or all combinations of the aspects of the ANDSE that was discussed in the previous figures. As such, the ANDSE affects accessing, obtaining and the provision of information, services, transactions, and/or the like across various communications networks. The features and embodiments of the ANDSE discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the ANDSE's features and facilities, and in many cases reduce the costs, energy consumption/requirements, and extend the life of ANDSE's underlying infrastructure; this has the added benefit of making the ANDSE more reliable. Similarly, many of the features and mechanisms are designed to be easier for users to use and access, thereby broadening the audience that may enjoy/employ and exploit the feature sets of the ANDSE; such ease of use also helps to increase the reliability of the ANDSE. In addition, the feature sets include heightened security as noted via the Cryptographic components 1920, 1926, 1928 and throughout, making access to the features and data more reliable and secure The ANDSE transforms embedding neural network training request, object search request inputs, via ANDSE components (e.g., ENNT, OSP), into embedding neural network response, object search response outputs.

The ANDSE component enabling access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the ANDSE server employs a cryptographic server to encrypt and decrypt communications. The ANDSE component may communicate to and/or with other components in a component collection, including itself, and/or facilities of the like. Most frequently, the ANDSE component communicates with the ANDSE database, operating systems, other program components, and/or the like. The ANDSE may contain, communicate, generate, obtain, and/or provide program component, system, user, and/or data communications, requests, and/or responses.

Distributed ANDSEs

The structure and/or operation of any of the ANDSE node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the ANDSE controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for ANDSE controller and/or ANDSE component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the ANDSE controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSI socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.d oc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference. Additional embodiments may include:

1. A neighbor discovery search engine apparatus, comprising:
   a memory;
   a component collection in the memory, including:
      an embedding neural network training component;
   a processor disposed in communication with the memory, and configured to issue a plurality of processing instructions from the component collection stored in the memory,
      wherein the processor issues instructions from the embedding neural network training component, stored in the memory, to:
         obtain, via at least one processor, an embedding neural network training request associated with a set of context objects;
         determine, via at least one processor, sample similarity evaluation metrics associated with the embedding neural network training request;
         determine, via at least one processor, for each context object in the set of context objects, a set of positive target samples that satisfy the sample similarity evaluation metrics for the respective context object;
         add, via at least one processor, to a training set, for each context object and each positive target sample in the respective set of positive target samples, a training example that comprises: (a) the respective context object and (b) a positive target sample; determine, via at least one processor, configuration parameters for an embedding neural network, wherein the embedding neural network comprises an input layer, a hidden layer, an embedding layer and an output layer, wherein the embedding layer facili-tates calculating embeddings that facilitate comparison of context objects based on embedding distance;
         train, via at least one processor, the embedding neural network using training examples in the training set, wherein the embedding neural network is trained using a selected training example by: (a) generating a context feature vector for the context object associated with the selected training example and providing the context feature vector for the input layer, (b) generating a target feature vector for the positive tar-get sample associated with the selected training example and providing the target feature vector for the output layer, (c) adjusting weights of the embedding neural network using a machine learning technique; and
         generate, via at least one processor, a datastructure that stores the adjusted weights of the embedding neural network.

2. The apparatus of embodiment 1, wherein a context object includes a set of features, wherein each fea-ture in the set of features is assigned one of a plurality of possible values.

3. The apparatus of embodiment 1, wherein the set of context objects is determined based on a training period for training the embedding neural network.

4. The apparatus of embodiment 1, wherein a positive target sample for a context object is another con-text object.

5. The apparatus of embodiment 1, wherein the size of a set of positive target samples for a context ob-ject is capped based on a threshold number.

6. The apparatus of embodiment 1, wherein the dimensionality of the input layer is equal to the dimensionality of the output layer.

7. The apparatus of embodiment 1, wherein the dimensionality of the embedding layer is at least an order of magnitude lower than the dimensionality of the input layer.

8. The apparatus of embodiment 1, wherein a context feature vector is a zero-one vector that identifies positive feature values associated with the respective context with a 1 and negative feature values not associated with the respective context with a 0.

9. The apparatus of embodiment 1, wherein the machine learning technique is backpropagation.

10. The apparatus of embodiment 9, further, comprising:
    the processor issues instructions from the embedding neural network training component, stored in the memory, to:
       select, via at least one processor, a subset of negative features associated with the target feature vector of the selected training example; and
       wherein the embedding neural network is trained using the selected training example by adjusting a subset of the weights of the embedding neural network corresponding to the selected subset of negative features per negative sampling.

11. The apparatus of embodiment 1, further, comprising:
    an object search processing component in the component collection; and
    the processor issues instructions from the object search processing component, stored in the memory, to:
       obtain, via at least one processor, an object search request associated with a query context object and a set of search context objects;
       obtain, via at least one processor, the adjusted weights of the embedding neural network;
       generate, via at least one processor, a query context feature vector for the query context object;
       calculate, via at least one processor, a query context object embedding using the adjusted weights of the embedding neural network and the query context feature vector;
       generate, via at least one processor, for each search context object in the set of search con-text objects, a search context feature vector;
       calculate, via at least one processor, for each search context object in the set of search con-text objects, a search context object embedding using the adjusted weights of the embedding neural network and the respective search context feature vector;
       calculate, via at least one processor, for each search context object in the set of search con-text objects, an embedding distance between the query context object embedding and the respective search context object embedding, wherein an embedding distance indicates the degree of similarity between two context objects;

add, via at least one processor, a subset of most similar search context objects, as determined by the calculated embedding distances, to a set of search results; and return, via at least one processor, the set of search results.

12. The apparatus of embodiment 11, wherein the set of search context objects is determined based on a search period associated with the object search request.

13. The apparatus of embodiment 11, wherein an embedding distance is calculated using at least one of: (a) Cosine Distance, and (b) Euclidean Distance.

14. The apparatus of embodiment 11, further, comprising:
the processor issues instructions from the object search processing component, stored in the memory, to:
calculate, via at least one processor, a first distance between (a) the query context object and (b) the center of the set of search results; and
add, via at least one processor, a selected search context object to the set of search results when it is determined that a second distance between (a) the query context object, and (b) the center of a new set comprising the set of search results and the selected search context object is shorter than the first distance.

15. The apparatus of embodiment 11, further, comprising:
the processor issues instructions from the object search processing component, stored in the memory, to:
calculate, via at least one processor, a price for the query context object based on prices of search context objects in the set of search results.

16. A processor-readable neighbor discovery search engine non-transient physical medium storing processor-executable components, the components, comprising:
a component collection stored in the medium, including:
an embedding neural network training component;
wherein the embedding neural network training component, stored in the medium, includes processor-issuable instructions to:
obtain, via at least one processor, an embedding neural network training request associated with a set of context objects;
determine, via at least one processor, sample similarity evaluation metrics associated with the embedding neural network training request;
determine, via at least one processor, for each context object in the set of context objects, a set of positive target samples that satisfy the sample similarity evaluation metrics for the respective context object;
add, via at least one processor, to a training set, for each context object and each positive target sample in the respective set of positive target samples, a training example that comprises: (a) the respective context object and (b) a positive target sample;
determine, via at least one processor, configuration parameters for an embedding neural network, wherein the embedding neural network comprises an input layer, a hidden layer, an embedding layer and an output layer, wherein the embedding layer facilitates calculating embeddings that facilitate comparison of context objects based on embedding distance;
train, via at least one processor, the embedding neural network using training examples in the training set, wherein the embedding neural network is trained using a selected training example by: (a) generating a context feature vector for the context object associated with the selected training example and providing the context feature vector for the input layer, (b) generating a target feature vector for the positive target sample associated with the selected training example and providing the target feature vector for the output layer, (c) adjusting weights of the embedding neural network using a machine learning technique; and
generate, via at least one processor, a datastructure that stores the adjusted weights of the embedding neural network.

17. The medium of embodiment 16, wherein a context object includes a set of features, wherein each feature in the set of features is assigned one of a plurality of possible values.

18. The medium of embodiment 16, wherein the set of context objects is determined based on a training period for training the embedding neural network.

19. The medium of embodiment 16, wherein a positive target sample for a context object is another context object.

20. The medium of embodiment 16, wherein the size of a set of positive target samples for a context object is capped based on a threshold number.

21. The medium of embodiment 16, wherein the dimensionality of the input layer is equal to the dimensionality of the output layer.

22. The medium of embodiment 16, wherein the dimensionality of the embedding layer is at least an order of magnitude lower than the dimensionality of the input layer.

23. The medium of embodiment 16, wherein a context feature vector is a zero-one vector that identifies positive feature values associated with the respective context with a 1 and negative feature values not associated with the respective context with a 0.

24. The medium of embodiment 16, wherein the machine learning technique is backpropagation.

25. The medium of embodiment 24, further, comprising:
the embedding neural network training component, stored in the medium, includes processor-issuable instructions to:
select, via at least one processor, a subset of negative features associated with the target feature vector of the selected training example; and
wherein the embedding neural network is trained using the selected training example by adjusting a subset of the weights of the embedding neural network corresponding to the selected subset of negative features per negative sampling.

26. The medium of embodiment 16, further, comprising:
an object search processing component in the component collection; and
the object search processing component, stored in the medium, includes processor-issuable instructions to:
obtain, via at least one processor, an object search request associated with a query context object and a set of search context objects;
obtain, via at least one processor, the adjusted weights of the embedding neural network;
generate, via at least one processor, a query context feature vector for the query context object;

calculate, via at least one processor, a query context object embedding using the adjusted weights of the embedding neural network and the query context feature vector;
generate, via at least one processor, for each search context object in the set of search con-text objects, a search context feature vector;
calculate, via at least one processor, for each search context object in the set of search con-text objects, a search context object embedding using the adjusted weights of the embedding neural network and the respective search context feature vector;
calculate, via at least one processor, for each search context object in the set of search con-text objects, an embedding distance between the query context object embedding and the respective search context object embedding, wherein an embedding dis-tance indicates the degree of similarity between two context objects;
add, via at least one processor, a subset of most similar search context objects, as deter-mined by the calculated embedding distances, to a set of search results; and
return, via at least one processor, the set of search results.

27. The medium of embodiment 26, wherein the set of search context objects is determined based on a search period associated with the object search request.

28. The medium of embodiment 26, wherein an embedding distance is calculated using at least one of: (a) Cosine Distance, and (b) Euclidean Distance.

29. The medium of embodiment 26, further, comprising:
the object search processing component, stored in the medium, includes processor-issuable instructions to:
calculate, via at least one processor, a first distance between (a) the query context object and (b) the center of the set of search results; and
add, via at least one processor, a selected search context object to the set of search results when it is deter-mined that a second distance between (a) the query context object, and (b) the center of a new set comprising the set of search results and the selected search context object is shorter than the first dis-tance.

30. The medium of embodiment 26, further, comprising:
the object search processing component, stored in the medium, includes processor-issuable instructions to:
calculate, via at least one processor, a price for the query context object based on prices of search con-text objects in the set of search results.

31. A processor-implemented neighbor discovery search engine system, comprising:
an embedding neural network training component means, to:
obtain, via at least one processor, an embedding neural network training request associated with a set of context objects;
determine, via at least one processor, sample similarity evaluation metrics associated with the embedding neural network training request;
determine, via at least one processor, for each context object in the set of context objects, a set of positive target samples that satisfy the sample similarity evaluation metrics for the respective context object;
add, via at least one processor, to a training set, for each context object and each positive target sample in the respective set of positive target samples, a training example that comprises: (a) the respective context object and (b) a positive target sample;
determine, via at least one processor, configuration parameters for an embedding neural network, wherein the embedding neural network comprises an input layer, a hidden layer, an embedding layer and an output layer, wherein the embedding layer facili-tates calculating embeddings that facilitate compari-son of context objects based on embedding distance;
train, via at least one processor, the embedding neural network using training examples in the training set, wherein the embedding neural network is trained using a selected training example by: (a) generating a context feature vector for the context object asso-ciated with the selected training example and pro-viding the context feature vector for the input layer, (b) generating a target feature vector for the positive tar-get sample associated with the selected training example and providing the target feature vector for the output layer, (c) adjusting weights of the embed-ding neural network using a machine learning tech-nique; and
generate, via at least one processor, a datastructure that stores the adjusted weights of the embedding neural network.

32. The system of embodiment 31, wherein a context object includes a set of features, wherein each fea-ture in the set of features is assigned one of a plurality of possible values.

33. The system of embodiment 31, wherein the set of context objects is determined based on a training period for training the embedding neural network.

34. The system of embodiment 31, wherein a positive target sample for a context object is another con-text object.

35. The system of embodiment 31, wherein the size of a set of positive target samples for a context ob-ject is capped based on a threshold number.

36. The system of embodiment 31, wherein the dimension-ality of the input layer is equal to the dimen-sionality of the output layer.

37. The system of embodiment 31, wherein the dimension-ality of the embedding layer is at least an order of magnitude lower than the dimensionality of the input layer.

38. The system of embodiment 31, wherein a context feature vector is a zero-one vector that identifies positive feature values associated with the respective context with a 1 and negative feature values not associated with the respective context with a 0.

39. The system of embodiment 31, wherein the machine learning technique is backpropagation.

40. The system of embodiment 39, further, comprising:
the embedding neural network training component means, to:
select, via at least one processor, a subset of negative features associated with the target feature vector of the selected training example; and
wherein the embedding neural network is trained using the selected training example by adjusting a subset of the weights of the embedding neural network corre-sponding to the selected subset of negative features per negative sampling.

41. The system of embodiment 31, further, comprising:
an object search processing component means, to:
obtain, via at least one processor, an object search request associated with a query context object and a set of search context objects;

obtain, via at least one processor, the adjusted weights of the embedding neural network;

generate, via at least one processor, a query context feature vector for the query context object;

calculate, via at least one processor, a query context object embedding using the adjusted weights of the embedding neural network and the query context feature vector;

generate, via at least one processor, for each search context object in the set of search con-text objects, a search context feature vector;

calculate, via at least one processor, for each search context object in the set of search con-text objects, a search context object embedding using the adjusted weights of the embedding neural network and the respective search context feature vector;

calculate, via at least one processor, for each search context object in the set of search con-text objects, an embedding distance between the query context object embedding and the respective search context object embedding, wherein an embedding dis-tance indicates the degree of similarity between two con-text objects;

add, via at least one processor, a subset of most similar search context objects, as deter-mined by the calculated embedding distances, to a set of search results; and return, via at least one processor, the set of search results.

42. The system of embodiment 41, wherein the set of search context objects is determined based on a search period associated with the object search request.

43. The system of embodiment 41, wherein an embedding distance is calculated using at least one of: (a) Cosine Distance, and (b) Euclidean Distance.

44. The system of embodiment 41, further, comprising:
the object search processing component means, to:
calculate, via at least one processor, a first distance between (a) the query context object and (b) the center of the set of search results; and
add, via at least one processor, a selected search context object to the set of search results when it is deter-mined that a second distance between (a) the query context object, and (b) the center of a new set comprising the set of search results and the selected search context object is shorter than the first dis-tance.

45. The system of embodiment 41, further, comprising:
the object search processing component means, to:
calculate, via at least one processor, a price for the query context object based on prices of search con-text objects in the set of search results.

46. A processor-implemented neighbor discovery search engine method, comprising:
executing processor-implemented embedding neural net-work training component instructions to:
obtain, via at least one processor, an embedding neural network training request associated with a set of context objects;
determine, via at least one processor, sample similarity evaluation metrics associated with the embedding neural network training request;
determine, via at least one processor, for each context object in the set of context objects, a set of positive target samples that satisfy the sample similarity evaluation metrics for the respective context object;

add, via at least one processor, to a training set, for each context object and each positive target sample in the respective set of positive target samples, a training example that comprises: (a) the respective context object and (b) a positive target sample;

determine, via at least one processor, configuration parameters for an embedding neural network, wherein the embedding neural network comprises an input layer, a hidden layer, an embedding layer and an output layer, wherein the embedding layer facili-tates calculating embeddings that facilitate compari-son of context objects based on embedding distance;

train, via at least one processor, the embedding neural network using training examples in the training set, wherein the embedding neural network is trained using a selected training example by: (a) generating a context feature vector for the context object asso-ciated with the selected training example and pro-viding the context feature vector for the input layer, (b) generating a target feature vector for the positive tar-get sample associated with the selected training example and providing the target feature vector for the output layer, (c) adjusting weights of the embed-ding neural network using a machine learning tech-nique; and generate, via at least one processor, a datastructure that stores the adjusted weights of the embedding neural network.

47. The method of embodiment 46, wherein a context object includes a set of features, wherein each fea-ture in the set of features is assigned one of a plurality of possible values.

48. The method of embodiment 46, wherein the set of context objects is determined based on a training period for training the embedding neural network.

49. The method of embodiment 46, wherein a positive target sample for a context object is another con-text object.

50. The method of embodiment 46, wherein the size of a set of positive target samples for a context ob-ject is capped based on a threshold number.

51. The method of embodiment 46, wherein the dimension-ality of the input layer is equal to the dimen-sionality of the output layer.

52. The method of embodiment 46, wherein the dimension-ality of the embedding layer is at least an order of magnitude lower than the dimensionality of the input layer.

53. The method of embodiment 46, wherein a context feature vector is a zero-one vector that identifies positive feature values associated with the respective context with a 1 and negative feature values not associated with the respective context with a 0.

54. The method of embodiment 46, wherein the machine learning technique is backpropagation.

55. The method of embodiment 54, further, comprising:
executing processor-implemented embedding neural net-work training component instructions to:
select, via at least one processor, a subset of negative features associated with the target feature vector of the selected training example; and
wherein the embedding neural network is trained using the selected training example by adjusting a subset of the weights of the embedding neural network corre-sponding to the selected subset of negative features per negative sampling.

56. The method of embodiment 46, further, comprising:
   executing processor-implemented object search processing component instructions to:
      obtain, via at least one processor, an object search request associated with a query context object and a set of search context objects;
      obtain, via at least one processor, the adjusted weights of the embedding neural network;
      generate, via at least one processor, a query context feature vector for the query context object;
      calculate, via at least one processor, a query context object embedding using the adjusted weights of the embedding neural network and the query context feature vector;
      generate, via at least one processor, for each search context object in the set of search con-text objects, a search context feature vector;
      calculate, via at least one processor, for each search context object in the set of search con-text objects, a search context object embedding using the adjusted weights of the embedding neural network and the respective search context feature vector;
      calculate, via at least one processor, for each search context object in the set of search con-text objects, an embedding distance between the query context object embedding and the respective search context object embedding, wherein an embedding dis-tance indicates the degree of similarity between two con-text objects;
      add, via at least one processor, a subset of most similar search context objects, as deter-mined by the calculated embedding distances, to a set of search results; and
      return, via at least one processor, the set of search results.
57. The method of embodiment 56, wherein the set of search context objects is determined based on a search period associated with the object search request.
58. The method of embodiment 56, wherein an embedding distance is calculated using at least one of: (a) Cosine Distance, and (b) Euclidean Distance.
59. The method of embodiment 56, further, comprising:
   executing processor-implemented object search processing component instructions to:
      calculate, via at least one processor, a first distance between (a) the query context object and (b) the center of the set of search results; and
      add, via at least one processor, a selected search context object to the set of search results when it is determined that a second distance between (a) the query context object, and (b) the center of a new set comprising the set of search results and the selected search context object is shorter than the first distance.
60. The method of embodiment 56, further, comprising:
   executing processor-implemented object search processing component instructions to:
      calculate, via at least one processor, a price for the query context object based on prices of search context objects in the set of search results.

In order to address various issues and advance the art, the entirety of this application for AI-Based Neighbor Discovery Search Engine Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a ANDSE individual and/or enterprise user, database configuration and/or relational model, data type, data transmission and/or network framework, syntax structure, and/or the like, various embodiments of the ANDSE, may be implemented that allow a great deal of flexibility and customization. For example, aspects of the ANDSE may be adapted for searching through a different types of contexts for a variety of applications. While various embodiments and discussions of the ANDSE have included search engines, however, it is to be understood that the embodiments described herein may be readily configured and/or customized for a wide variety of other applications and/or implementations.

What is claimed is:

1. A neighbor discovery search engine apparatus, comprising:
    a memory;
    a component collection in the memory, including:
        an embedding neural network training component;
    a processor disposed in communication with the memory, and configured to issue a plurality of processing instructions from the component collection stored in the memory,
        wherein the processor issues instructions from the embedding neural network training component, stored in the memory, to:
            obtain, via at least one processor, an embedding neural network training request associated with a set of context objects;
            determine, via at least one processor, sample similarity evaluation metrics associated with the embedding neural network training request;
            determine, via at least one processor, for each context object in the set of context objects, a set of positive target samples that satisfy the sample similarity evaluation metrics for the respective context object;
            add, via at least one processor, to a training set, for each context object and each positive target sample in the respective set of positive target samples, a training example that comprises: (a) the respective context object and (b) a positive target sample;
            determine, via at least one processor, configuration parameters for an embedding neural network, wherein the embedding neural network comprises an input layer, a hidden layer, an embedding layer and an output layer, wherein the embedding layer facilitates calculating embeddings that facilitate comparison of context objects based on embedding distance;
            train, via at least one processor, the embedding neural network using training examples in the training set, wherein the embedding neural network is trained using a selected training example by: (a) generating a context feature vector for the context object associated with the selected training example and providing the context feature vector for the input layer, (b) generating a target feature vector for the positive target sample associated with the selected training example and providing the target feature vector for the output layer, (c) adjusting weights of the embedding neural network using a machine learning technique; and
            generate, via at least one processor, a datastructure that stores the adjusted weights of the embedding neural network.

2. The apparatus of claim 1, wherein a context object includes a set of features, wherein each feature in the set of features is assigned one of a plurality of possible values.

3. The apparatus of claim 1, wherein the set of context objects is determined based on a training period for training the embedding neural network.

4. The apparatus of claim 1, wherein a positive target sample for a context object is another context object.

5. The apparatus of claim 1, wherein the size of a set of positive target samples for a context object is capped based on a threshold number.

6. The apparatus of claim 1, wherein the dimensionality of the input layer is equal to the dimensionality of the output layer.

7. The apparatus of claim 1, wherein the dimensionality of the embedding layer is at least an order of magnitude lower than the dimensionality of the input layer.

8. The apparatus of claim 1, wherein a context feature vector is a zero-one vector that identifies positive feature values associated with the respective context with a 1 and negative feature values not associated with the respective context with a 0.

9. The apparatus of claim 1, wherein the machine learning technique is backpropagation.

10. The apparatus of claim 9, further, comprising:
    the processor issues instructions from the embedding neural network training component, stored in the memory, to:
        select, via at least one processor, a subset of negative features associated with the target feature vector of the selected training example; and
        wherein the embedding neural network is trained using the selected training example by adjusting a subset of the weights of the embedding neural network corresponding to the selected subset of negative features per negative sampling.

11. The apparatus of claim 1, further, comprising:
    an object search processing component in the component collection; and
    the processor issues instructions from the object search processing component, stored in the memory, to:
        obtain, via at least one processor, an object search request associated with a query context object and a set of search context objects;
        obtain, via at least one processor, the adjusted weights of the embedding neural network;
        generate, via at least one processor, a query context feature vector for the query context object;
        calculate, via at least one processor, a query context object embedding using the adjusted weights of the embedding neural network and the query context feature vector;
        generate, via at least one processor, for each search context object in the set of search context objects, a search context feature vector;
        calculate, via at least one processor, for each search context object in the set of search context objects, a search context object embedding using the adjusted weights of the embedding neural network and the respective search context feature vector;

calculate, via at least one processor, for each search context object in the set of search context objects, an embedding distance between the query context object embedding and the respective search context object embedding, wherein an embedding distance indicates the degree of similarity between two context objects;

add, via at least one processor, a subset of most similar search context objects, as determined by the calculated embedding distances, to a set of search results; and return, via at least one processor, the set of search results.

12. The apparatus of claim 11, wherein the set of search context objects is determined based on a search period associated with the object search request.

13. The apparatus of claim 11, wherein an embedding distance is calculated using at least one of: (a) Cosine Distance, and (b) Euclidean Distance.

14. The apparatus of claim 11, further, comprising:
the processor issues instructions from the object search processing component, stored in the memory, to:
calculate, via at least one processor, a first distance between (a) the query context object and (b) the center of the set of search results; and
add, via at least one processor, a selected search context object to the set of search results when it is determined that a second distance between (a) the query context object, and (b) the center of a new set comprising the set of search results and the selected search context object is shorter than the first distance.

15. The apparatus of claim 11, further, comprising:
the processor issues instructions from the object search processing component, stored in the memory, to:
calculate, via at least one processor, a price for the query context object based on prices of search context objects in the set of search results.

16. A processor-readable neighbor discovery search engine non-transient physical medium storing processor-executable components, the components, comprising:
a component collection stored in the medium, including:
an embedding neural network training component;
wherein the embedding neural network training component, stored in the medium, includes processor-issuable instructions to:
obtain, via at least one processor, an embedding neural network training request associated with a set of context objects;
determine, via at least one processor, sample similarity evaluation metrics associated with the embedding neural network training request;
determine, via at least one processor, for each context object in the set of context objects, a set of positive target samples that satisfy the sample similarity evaluation metrics for the respective context object;
add, via at least one processor, to a training set, for each context object and each positive target sample in the respective set of positive target samples, a training example that comprises: (a) the respective context object and (b) a positive target sample;

determine, via at least one processor, configuration parameters for an embedding neural network, wherein the embedding neural network comprises an input layer, a hidden layer, an embedding layer and an output layer, wherein the embedding layer facili-tates calculating embeddings that facilitate comparison of context objects based on embedding distance;
train, via at least one processor, the embedding neural network using training examples in the training set, wherein the embedding neural network is trained using a selected training example by: (a) generating a context feature vector for the context object associated with the selected training example and providing the context feature vector for the input layer, (b) generating a target feature vector for the positive tar-get sample associated with the selected training example and providing the target feature vector for the output layer, (c) adjusting weights of the embedding neural network using a machine learning technique; and
generate, via at least one processor, a datastructure that stores the adjusted weights of the embedding neural network.

17. A processor-implemented neighbor discovery search engine system, comprising:
an embedding neural network training component means, to:
obtain, via at least one processor, an embedding neural network training request associated with a set of context objects;
determine, via at least one processor, sample similarity evaluation metrics associated with the embedding neural network training request;
determine, via at least one processor, for each context object in the set of context objects, a set of positive target samples that satisfy the sample similarity evaluation metrics for the respective context object;
add, via at least one processor, to a training set, for each context object and each positive target sample in the respective set of positive target samples, a training example that comprises: (a) the respective context object and (b) a positive target sample;
determine, via at least one processor, configuration parameters for an embedding neural network, wherein the embedding neural network comprises an input layer, a hidden layer, an embedding layer and an output layer, wherein the embedding layer facili-tates calculating embeddings that facilitate comparison of context objects based on embedding distance;
train, via at least one processor, the embedding neural network using training examples in the training set, wherein the embedding neural network is trained using a selected training example by: (a) generating a context feature vector for the context object associated with the selected training example and providing the context feature vector for the input layer, (b) generating a target feature vector for the positive tar-get sample associated with the selected training example and providing the target feature vector for the output layer, (c) adjusting weights of the embedding neural network using a machine learning technique; and
generate, via at least one processor, a datastructure that stores the adjusted weights of the embedding neural network.

18. A processor-implemented neighbor discovery search engine method, comprising:
  executing processor-implemented embedding neural network training component instructions to:
    obtain, via at least one processor, an embedding neural network training request associated with a set of context objects;
    determine, via at least one processor, sample similarity evaluation metrics associated with the embedding neural network training request;
    determine, via at least one processor, for each context object in the set of context objects, a set of positive target samples that satisfy the sample similarity evaluation metrics for the respective context object;
    add, via at least one processor, to a training set, for each context object and each positive target sample in the respective set of positive target samples, a training example that comprises: (a) the respective context object and (b) a positive target sample;
    determine, via at least one processor, configuration parameters for an embedding neural network, wherein the embedding neural network comprises an input layer, a hidden layer, an embedding layer and an output layer, wherein the embedding layer facilitates calculating embeddings that facilitate comparison of context objects based on embedding distance;
    train, via at least one processor, the embedding neural network using training examples in the training set, wherein the embedding neural network is trained using a selected training example by: (a) generating a context feature vector for the context object associated with the selected training example and providing the context feature vector for the input layer, (b) generating a target feature vector for the positive tar-get sample associated with the selected training example and providing the target feature vector for the output layer, (c) adjusting weights of the embedding neural network using a machine learning technique; and
    generate, via at least one processor, a datastructure that stores the adjusted weights of the embedding neural network.

* * * * *